(12) United States Patent
Seneger et al.

(10) Patent No.: US 11,966,427 B2
(45) Date of Patent: Apr. 23, 2024

(54) KEYWORD-OBJECT TAXONOMY GENERATION AND UTILIZATION

(71) Applicant: Volvo Car Corporation, Gothenburg (SE)

(72) Inventors: Jon Martin Seneger, Monte Sereno, CA (US); Aykut Yararbas, San Jose, CA (US)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 17/369,426

(22) Filed: Jul. 7, 2021

(65) Prior Publication Data
US 2023/0009197 A1 Jan. 12, 2023

(51) Int. Cl.
*G06F 16/332* (2019.01)
*G06Q 30/0241* (2023.01)

(52) U.S. Cl.
CPC ..... *G06F 16/3329* (2019.01); *G06Q 30/0241* (2013.01)

(58) Field of Classification Search
CPC .................................................. G06F 16/3329
See application file for complete search history.

(56) References Cited

U.S. PATENT DOCUMENTS

| | | | | |
|---|---|---|---|---|
| 2010/0145940 | A1* | 6/2010 | Chen | G06F 16/951 707/E17.014 |
| 2012/0109925 | A1* | 5/2012 | Morscher | G06F 16/353 707/706 |
| 2020/0265071 | A1* | 8/2020 | Parthasarathy | G06F 9/505 |
| 2021/0287277 | A1* | 9/2021 | Srinivasan | G06Q 30/0641 |

OTHER PUBLICATIONS

Wikipedia | Feature selection. https://en.wikipedia.org/wiki/Feature_selection, last accessed on May 10, 2021, 18 pages.

* cited by examiner

*Primary Examiner* — Van H Oberly
(74) *Attorney, Agent, or Firm* — Amin, Turocy & Watson, LLP

(57) ABSTRACT

Systems and techniques that facilitate keyword-object taxonomy generation and utilization are provided. In various embodiments, a system can comprise a receiver component that can access an input object class. In various aspects, the system can comprise a taxonomy component that can output one or more keyword combinations that are non-redundant and relevant to the input object class, based on querying a keyword-object taxonomy. In various instances, the receiver component can access (and/or be provided with an electronic link to) a set of recorded keyword combinations and a set of recorded object classes respectively corresponding to the set of keyword combinations. In various cases, the taxonomy component can generate the keyword-object taxonomy based on the set of recorded keyword combinations and the set of recorded object classes.

20 Claims, 15 Drawing Sheets

KEYWORD-OBJECT TAXONOMY GENERATION AND UTILIZATION

TECHNICAL FIELD

The subject disclosure relates to semantic analysis, and more specifically to keyword-object taxonomy generation and utilization.

BACKGROUND

A marketing campaign can be a discounted sales offering of a product or service for a limited period of time. To ensure that potential customers are aware of the marketing campaign, an entity that facilitates the marketing campaign can implement advertising, where such advertising can include words or phrases that describe the product or service that is the subject of the marketing campaign. Unfortunately, when existing techniques are utilized, such words or phrases are subjectively chosen by the entity that is running the marketing campaign, rather than being objectively chosen in a data-driven manner. Accordingly, when existing techniques are implemented, the words or phrases involved in a marketing campaign are likely not the words or phrases that would garner maximum attention from potential customers.

Systems and/or techniques that can address one or more of these problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that can facilitate keyword object taxonomy generation and utilization are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a receiver component. In various aspects, the receiver component can access an input object class. In various instances, the computer-executable components can comprise a taxonomy component. In various cases, the taxonomy component can output one or more keyword combinations that are non-redundant and relevant to the input object class, based on querying a keyword-object taxonomy. In various aspects, the receiver component can access a set of recorded keyword combinations and a set of recorded object classes respectively corresponding to the set of recorded keyword combinations. In various instances, the taxonomy component can generate the keyword-object taxonomy, based on the set of recorded keyword combinations and the set of recorded object classes.

According to one or more embodiments, the above-described system can be implemented as a computer-implemented method and/or computer program product.

DETAILED DESCRIPTION

Figure 1:
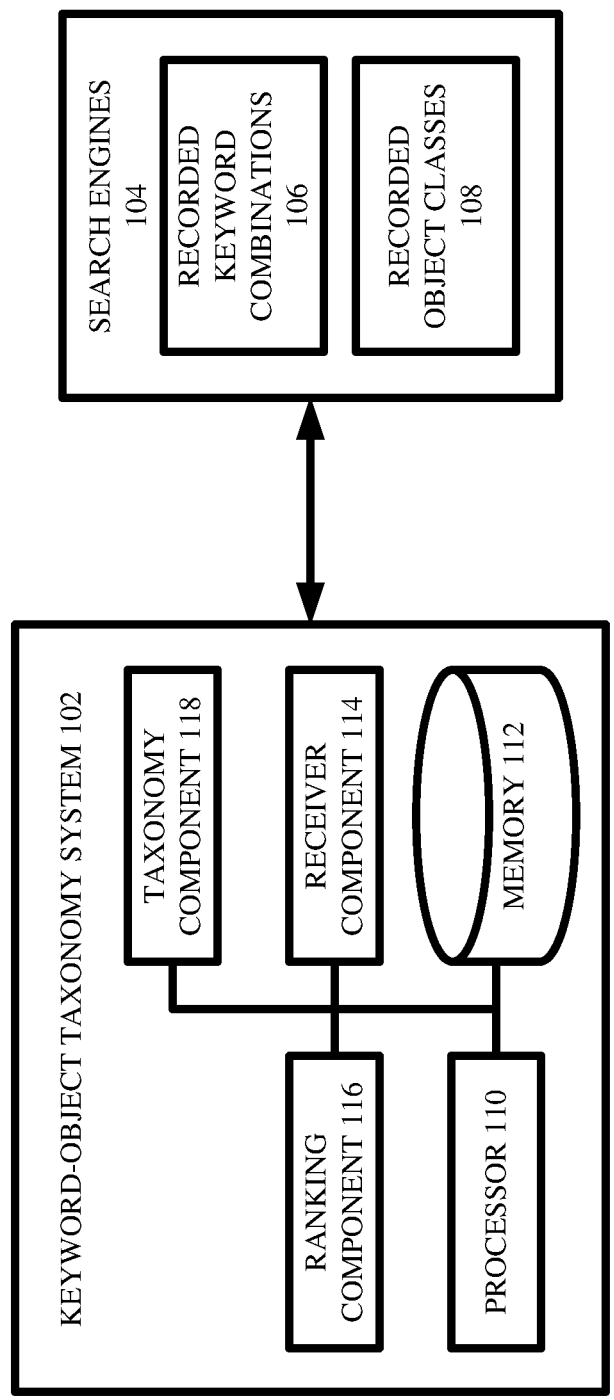
FIG. 1 illustrates a block diagram of an example, non-limiting system that facilitates keyword-object taxonomy generation and utilization in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As mentioned above, a marketing campaign can be a discounted sales offering of a product/service for a limited period of time. For instance, a marketing campaign can involve one or more products/services that are offered at reduced prices, that are offered together as a package deal, that are offered seasonally and/or on special occasions, and/or that are otherwise offered with some sort of additional benefit and/or reward. To ensure that potential customers are aware of the marketing campaign, an entity that facilitates the marketing campaign can implement advertising, such as television advertising, radio advertising, social media advertising, and/or billboard advertising.

Such advertising can include words or phrases that describe the product/service that is the subject of the marketing campaign. For instance, if a particular model of vehicle is the subject of a marketing campaign implemented by a vehicle manufacturer or vehicle dealer, advertising associated with that particular model of vehicle can include words or phrases that describe and/or characterize the particular model of vehicle (e.g., "durable," "fast," "electric", "cross country") and/or that otherwise identify features of that particular model of vehicle (e.g., "500 pound-feet of torque," "600 horsepower," "7.0 liter engine").

Unfortunately, when existing techniques are utilized, such words or phrases are subjectively chosen by the entity that is running the marketing campaign, rather than being objectively chosen in a data-driven manner. More specifically, such words or phrases can be considered as reflecting the intentions and/or conceptions of the entity running the marketing campaign (e.g., can be words/phrases which the entity running the marketing campaign believes are most strongly linked to the product/service that is the subject of the marketing campaign), rather than reflecting the intentions and/or conceptions of potential customers that are the target audience of the marketing campaign (e.g., can fail to be the words/phrases which the potential customers believe are most strongly linked to the product/service). Because existing techniques ignore the intentions and/or conceptions of the potential customers, the words or phrases that are included in advertising for a marketing campaign can fail to garner maximum attention from the potential customers. Thus, systems and/or techniques for objectively selecting words/phrases based on the intentions and/or conceptions of potential customers can be desirable.

Various embodiments of the invention can address one or more of these technical problems by facilitating keyword-object taxonomy generation and/or utilization. In particular, various embodiments of the invention can be considered as a computerized tool (e.g., any suitable combination of computer-executable hardware and/or computer-executable software) that can electronically build a keyword-object taxonomy based on the intentions and/or conceptions of potential customers, which intentions and/or conceptions can be objectively captured via search engine histories.

More specifically, a potential customer can input a keyword combination into a search engine (e.g., Google®, Bing®), the search engine can return as a result a set of links based on the keyword combination, and the potential customer can click on any of the returned links. Moreover, the clicked link can yield a webpage that describes and/or otherwise pertains to any suitable product (e.g., a specific model of vehicle that is for sale, a specific model of vacuum cleaner that is for sale, a specific video game that is for sale), any suitable service (e.g., a specific type of landscaping service, a specific type of house cleaning service, a specific type of legal service), any suitable activity (e.g., a specific type of recreational activity, a specific type of volunteer activity), any suitable organization (e.g., a specific university, a specific vendor, a specific musical group/band), any suitable person (e.g., a specific celebrity, a specific athlete, a specific politician), and/or so on. More generally, the product, service, activity, organization, person, and/or otherwise that corresponds to the webpage yielded by the clicked link can be referred to and/or otherwise designated as an object class. In various cases, an object class can be recited at any suitable level of granularity (e.g., an object class can be a broad category of product, can be a specific type of product, can be a specific product having specific features, can be a specific product offered during a specific time period, and/or can be a specific product offered in a specific geographical region).

In various cases, the search engine can record the online journey from the keyword combination inputted by the potential customer to the object class that pertains to the webpage yielded by the clicked link. Thus, in various aspects, the keyword combination can be considered as corresponding to and/or otherwise being associated with the object class. In other words, it can be inferred that, when the potential customer inputted the keyword combination into the search engine, the intent of the potential customer was to ultimately arrive at the object class.

In various instances, any suitable number of potential customers can engage with any suitable number of search engines in the above-mentioned fashion over any suitable time period and/or in any suitable geographic locations. Because each search engine can record each online journey of each potential customer from inputted keyword to ultimate object class, the result can be a plurality of keyword combinations that respectively correspond to a plurality of object classes.

In various aspects, the computerized tool described herein can electronically receive and/or access both the plurality of keyword combinations and the plurality of object classes. Moreover, the computerized tool can electronically analyze the plurality of keyword combinations and the plurality of object classes, such as via a feature selection algorithm, to identify which keyword combinations are most strongly correlated with which object classes. In various cases, one or more keyword combinations that are most strongly correlated with an object class and/or that are least internally redundant can be referred to as one or more best keyword combinations for that object class. Once such one or more best keyword combinations are identified for any given object class, the computerized tool can electronically establish a linkage and/or mapping between the one or more best keyword combinations and the given object class. In various cases, the computerized tool has created such linkage and/or mapping for each unique object class in the plurality of object classes, and the resultant linkages and/or mappings can collectively be considered as the keyword-object taxonomy.

Once the keyword-object taxonomy is built, the computerized tool can query the keyword-object taxonomy so as to identify the best keyword combination for any given object class. That is, the computerized tool can electronically receive as input a particular object class, and the computerized tool can electronically identify as output the one or more best keyword combinations that are linked and/or mapped to the particular object class in the keyword-object taxonomy. Because such one or more best keyword combinations can be derived from the search engine histories of actual potential customers, such one or more best keyword combinations can be considered as objectively representing the words/phrases which potential customers collectively regard as the most relevant to the particular object class. Accordingly, if it is desired to facilitate a marketing campaign the subject of which is the particular object class, the one or more best keyword combinations that are returned by the computerized tool can be used in advertising for such marketing campaign.

In various embodiments, the computerized tool described herein can comprise a receiver component, a ranking component, and/or a taxonomy component.

In various aspects, any suitable number of search engines can record any suitable number of search histories of any suitable number of potential customers over any suitable period of time and/or in any suitable geographic areas. The result of such recording can be a set of keyword combinations and a set of object classes that respectively correspond to the set of keyword combinations. In various instances, if a particular a keyword combination in the set of keyword combinations corresponds to a particular object class in the set of object classes, this can indicate that some potential customer (e.g., some entity, whether human or otherwise) had inputted the particular keyword combination into some search engine and had ultimately clicked on a link leading to a webpage describing and/or otherwise associated with the particular object class. Thus, it can be inferred that the particular keyword combination evinces and/or otherwise reveals a potential customer's intent to arrive at the particular object class. In various cases, an object class can represent and/or otherwise designate any suitable product, service, activity, organization, institution, person, animal, and/or entity, as desired.

In various embodiments, the receiver component of the computerized tool can electronically receive and/or otherwise access the set of keyword combinations and/or the set of object classes. In various aspects, the receiver component can electronically retrieve and/or receive the set of keyword combinations and/or the set of object classes from the any suitable number of search engines. In various other aspects, the receiver component can electronically retrieve and/or receive the set of keyword combinations and/or the set of object classes from any suitable database and/or data structure (e.g., graph data structure, relational data structure, hybrid data structure) that is accessible to the receiver component, whether centralized and/or decentralized, and/or whether remote from and/or local to the receiver component. In still other cases, the receiver component can electronically retrieve and/or receive the set of keyword combinations and/or the set of object classes from any suitable electronic link (e.g., a link to search engine query parameters). In any case, the receiver component can obtain the set of keyword combinations and/or the set of object classes, such that other components of the computerized tool can manipulate and/or otherwise interact with the set of keyword combinations and/or the set of object classes.

In various embodiments, the ranking component of the computerized tool can electronically rank, via a feature selection algorithm, the set of keyword combinations according to relevance and/or redundancy with respect to the set of object classes. In some instances, the feature selection algorithm can be a Minimum Redundancy Maximum Relevance (mRMR) algorithm. In other instances, the feature selection algorithm can be any other suitable machine learning algorithm that can select a subset of relevant features, variables, and/or attributes from a total set of features, variables, and/or attributes, so as to eliminate redundant and/or irrelevant features, variables, and/or attributes from the total set. In any case, the ranking component can execute the feature selection algorithm on the set of keyword combinations and the set of object classes.

In various aspects, execution of the feature selection algorithm can cause the ranking component to identify each unique keyword in the set of keyword combinations and to identify each unique object class in the set of object classes. Moreover, in various instances, execution of the feature selection algorithm can cause the ranking component to compute a relevance score between each unique keyword and each unique object class (e.g., the relevance score can be a scalar that conveys how strongly the unique keyword is correlated and/or co-incident with the unique object class). Furthermore, in various cases, execution of the feature selection algorithm can cause the ranking component to compute a redundancy score between each pair of unique keywords (e.g., the redundancy score can be a scalar that conveys how strongly the two unique keywords in the pair are correlated and/or co-incident with each other). Further still, in various aspects, execution of the feature selection algorithm can cause the ranking component to identify and/or generate, for each unique object class, a combination of unique keywords that has a maximized average relevance score with respect to the unique object class and a minimized average redundancy score with respect to each other. In various cases, such combination of unique keywords for a given unique object class can be considered as the best keyword combination for that given unique object class.

In various embodiments, the taxonomy component of the computerized tool can electronically generate a keyword-object taxonomy based on the execution of the feature selection algorithm by the ranking component. More specifically, as mentioned above, the ranking component can identify a best keyword combination (e.g., maximally relevant and minimally redundant combination of unique keywords) for each unique object class in the set of object classes. Accordingly, the taxonomy component can, for each unique object class, generate a linkage and/or mapping between the unique object class and its corresponding best keyword combination. Once the taxonomy component has done this for all of the unique object classes, the result can be a set of respective linkages and/or mappings from unique object classes to best keyword combinations. In various instances, such set of respective linkages and/or mappings can be considered as the keyword-object taxonomy.

In various embodiments, the computerized tool can leverage the keyword-object taxonomy so as to identify a best keyword combination for any given object class. For example, the receiver component can, in various aspects, electronically receive from any suitable client device an input object class. In various instances, the taxonomy component can query the keyword-object taxonomy in search of the input object class. Once the taxonomy component identifies the input object class in the keyword-object taxonomy, the taxonomy component can identify in the keyword-object taxonomy the best keyword combination that is linked and/or mapped to the input object class. Accordingly, the taxonomy component can electronically output and/or transmit to the client device the best keyword combination that is linked/mapped to the input object class. In other words, the input object class can be considered and/or otherwise interpreted as a query for words/phrases that are maximally relevant and minimally redundant with respect to the input object class from the perspective of potential customers, and the best keyword combination that is linked/mapped to the input object class in the keyword-object taxonomy can be considered as such maximally relevant and minimally redundant words/phrases.

To help clarify some of the above discussion, consider the following non-limiting example. Suppose that the set of object classes includes two objects classes: a first object class representing a model year 2021 Volvo® V60 vehicle, and a second object class representing a model year 2021 Volvo® XC40 vehicle. Accordingly, the set of keyword combinations can comprise any suitable number of keyword combinations corresponding to the 2021 Volvo® V60, and can also include any suitable number of keyword combinations corresponding to the 2021 Volvo® XC40.

More specifically, the keyword combinations that correspond to the 2021 Volvo® V60 can be considered as words/phrases which potential customers had entered into a search engine (e.g., Google®, Bing®), where the search engine had provided as a search result a link to a webpage corresponding to the 2021 Volvo® V60, and where such potential customers had clicked on the link to the webpage corresponding to the 2021 Volvo® V60. Examples of such keyword combinations might be "2021 volvo v60," "volvo v60," "volvo cross country 2021," "volvo cross country," "v60 cross country," "volvo cc," and/or "2021 cross country wagon." Similarly, the keyword combinations that correspond to the 2021 Volvo® XC40 can be considered as words/phrases which potential customers had entered into a search engine (e.g., Google®, Bing®), where the search engine had provided as a search result a link to a webpage corresponding to the 2021 Volvo® XC40, and where such potential customers had clicked on the link to the webpage corresponding to the 2021 Volvo® XC40. Examples of such keyword combinations might be "2021 volvo xc40," "volvo xc40," "volvo electric 2021," "volvo hybrid," "volvo recharge," and/or "volvo ev suv."

In various instances, the receiver component can electronically access and/or retrieve the set of keyword combinations and the set of object classes. In various aspects, the ranking component can apply the feature selection algorithm (e.g., mRMR) to the set of keyword combinations and the set of object classes.

As explained above, execution of the feature selection algorithm can cause the ranking component to identify each unique object class in the set of object classes. Accordingly, in this non-limiting example, the ranking component can identify the first object class representing the 2021 Volvo® V60 and the second object class representing the 2021 Volvo® XC40.

As also explained above, execution of the feature selection algorithm can cause the ranking component to identify each unique keyword in the set of keyword combinations. Accordingly, in this non-limiting example, such unique keywords can include "volvo," "2021," "v60," "xc40," "cross," "country," "cc," "wagon," "electric," "ev," "hybrid," "recharge," and/or "suv."

As mentioned above, execution of the feature selection algorithm can cause the ranking component to compute a relevance score between each unique keyword and each unique object class, where such relevance score can indicate how closely correlated the unique keyword is to the unique object class. For instance, in this non-limiting example, the ranking component can compute a relevance score between the unique keyword "volvo" and the unique object class representing the 2021 Volvo® V60 (e.g., although "volvo" can appear in very many of the set of keyword combinations that correspond to the 2021 Volvo® V60 webpage, "volvo" can also appear in very many of the set of keyword combinations that correspond to the 2021 Volvo® XC40 webpage; thus, "volvo" can be somewhat correlated with the 2021 Volvo® V60, and so this relevance score can be intermediate). Additionally, the ranking component can compute a relevance score between the unique keyword "volvo" and the unique object class representing the 2021 Volvo® XC40 (e.g., although "volvo" can appear in very many of the set of keyword combinations that correspond to the 2021 Volvo® XC40 webpage, "volvo" can also appear in very many of the set of keyword combinations that correspond to the 2021 Volvo® V60 webpage; thus, "volvo" can be somewhat correlated with 2021 Volvo® XC40, and so this relevance score can be intermediate).

In like fashion, the ranking component can compute a relevance score between the unique keyword "electric" and the unique object class representing the 2021 Volvo® V60 (e.g., "electric" can appear in very few of the set of keyword combinations that correspond to the 2021 Volvo® V60 webpage, and "electric" can appear in very many of the set of keyword combinations that correspond to the 2021 Volvo® XC40 webpage; thus, "electric" can be not correlated with 2021 Volvo® V60, and so this relevance score can be low). Additionally, the ranking component can compute a relevance score between the unique keyword "electric" and the unique object class representing the 2021 Volvo® XC40 (e.g., again, "electric" can appear in very few of the set of keyword combinations that correspond to the 2021 Volvo® V60 webpage, and "electric" can appear in very many of the set of keyword combinations that correspond to the 2021 Volvo® XC40 webpage; thus, "electric" can be strongly correlated with 2021 Volvo® XC40, and so this relevance score can be high).

Similarly, the ranking component can compute a relevance score between the unique keyword "cross" and the unique object class representing the 2021 Volvo® V60 (e.g., "cross" can appear in very many of the set of keyword combinations that correspond to the 2021 Volvo® V60 webpage, and "cross" can appear in very few of the set of keyword combinations that correspond to the 2021 Volvo® XC40 webpage; thus, "cross" can be strongly correlated with 2021 Volvo® V60, and so this relevance score can be high). Additionally, the ranking component can compute a relevance score between the unique keyword "cross" and the unique object class representing the 2021 Volvo® XC40 (e.g., again, "cross" can appear in very many of the set of keyword combinations that correspond to the 2021 Volvo® V60 webpage, and "cross" can appear in very few of the set of keyword combinations that correspond to the 2021 Volvo® XC40 webpage; thus, "cross" can be not correlated with 2021 Volvo® XC40, and so this relevance score can be low).

In this way, execution of the feature selection algorithm can cause the ranking component to compute a relevance score between each unique keyword and each unique object class.

As also mentioned above, execution of the feature selection algorithm can cause the ranking component to compute a redundancy score between each pair of unique keywords, where such redundancy score can indicate how closely correlated the pair of unique keywords are with each other. For instance, in this non-limiting example, the ranking component can compute a redundancy score between the unique keyword "volvo" and the unique keyword "electric"

(e.g., although "volvo" and "electric" can appear together in many of the set of keyword combinations, "volvo" can also appear in many of the set of keyword combinations that do not include "electric;" thus, "volvo" and "electric" can be somewhat correlated, and so this redundancy score can be intermediate).

In like fashion, the ranking component can compute a redundancy score between the unique keyword "electric" and the unique keyword "cross" (e.g., "electric" and "cross" can appear together in very few of the set of keyword combinations and can appear separately in very many of the set of keyword combinations; thus, "electric" and "cross" can be not correlated, and so this redundancy score can be low).

Similarly, the ranking component can compute a redundancy score between the unique keyword "cross" and the unique keyword "country" (e.g., "cross" and "country" can appear together in very many of the set of keyword combinations and can appear separately in very few of the set of keyword combinations; thus, "cross" and "country" can be strongly correlated, and so this redundancy score can be high).

In this way, execution of the feature selection algorithm can cause the ranking component to compute a redundancy score between each pair of unique keywords.

In various aspects, the ranking component can, for each unique object class, iteratively compute different combinations of the unique keywords, so as to identify a combination of unique keywords whose average relevance score with respect to the unique object class is maximized and whose average redundancy score between each pair of unique keywords in the combination is minimized. Such maximally relevant and minimally redundant combination of unique keywords for a given object class can be referred to as the best keyword combination for that given unique object class.

For instance, the ranking component can identify the best keyword combination for the 2021 Volvo® V60 in the following way. The ranking component can iteratively build different combinations of the words "volvo," "2021," "v60," "xc40," "cross," "country," "cc," "wagon," "electric," "ev," "hybrid," "recharge," and/or "suv." For each such combination, the ranking component can compute the average relevance score of that combination with respect to the 2021 Volvo® V60 (e.g., the relevance score for "volvo cross country" with respect to the 2021 Volvo® V60 can be equal to the average of the individual relevance score of "volvo" with respect to the 2021 Volvo® V60, the individual relevance score of "cross" with respect to the 2021 Volvo® V60, and the individual relevance score of "country" with respect to the 2021 Volvo® V60). Additionally, for each such combination, the ranking component can also compute the average redundancy score of that combination (e.g., the redundancy score for "volvo cross country" can be equal to the average of the redundancy score between "volvo" and "cross," the redundancy score between "volvo" and "country," and the redundancy score between "cross" and "country"). Accordingly, for each such combination, the ranking component can subtract the average redundancy score from the average relevance score for the 2021 Volvo® V60, thereby yielding a ranking for that combination with respect to the 2021 Volvo® V60. In various cases, the combination for which such ranking with respect to 2021 Volvo® V60 is maximized can be considered as the best keyword combination for the 2021 Volvo® V60.

Likewise, the ranking component can identify the best keyword combination for the 2021 Volvo® XC40 in the following way. The ranking component can iteratively build different combinations of the words "volvo," "2021," "v60," "xc40," "cross," "country," "cc," "wagon," "electric," "ev," "hybrid," "recharge," and/or "suv." For each such combination, the ranking component can compute the average relevance score of that combination with respect to the 2021 Volvo® XC40 (e.g., the relevance score for "volvo cross country" with respect to the 2021 Volvo® XC40 can be equal to the average of the individual relevance score of "volvo" with respect to the 2021 Volvo® XC40, the individual relevance score of "cross" with respect to the 2021 Volvo® XC40, and the individual relevance score of "country" with respect to the 2021 Volvo® XC40). Additionally, for each such combination, the ranking component can also compute the average redundancy score of that combination (e.g., again, the redundancy score for "volvo cross country" can be equal to the average of the redundancy score between "volvo" and "cross," the redundancy score between "volvo" and "country," and the redundancy score between "cross" and "country"). Accordingly, for each such combination, the ranking component can subtract the average redundancy score from the average relevance score for the 2021 Volvo® XC40, thereby yielding a ranking for that combination with respect to the 2021 Volvo® XC40. In various cases, the combination for which such ranking with respect to 2021 Volvo® XC40 is maximized can be considered as the best keyword combination for the 2021 Volvo® XC40.

In various aspects, once the ranking component identifies the best keyword combination for the 2021 Volvo® V60, the taxonomy component can create a linkage and/or mapping between that best keyword combination and the 2021 Volvo® V60. Likewise, once the ranking component identifies the best keyword combination for the 2021 Volvo® XC40, the taxonomy component can create a linkage and/or mapping between that best keyword combination and the 2021 Volvo® XC40. In various cases, such linkages/mappings can be considered as the keyword-object taxonomy.

Finally, in various instances, when given an inputted object class, the taxonomy component can query the keyword-object taxonomy to identify the best keyword combination that is linked/mapped to the inputted object class. For example, suppose that an entity desires to launch a marketing campaign for the 2021 Volvo® V60. In such case, the entity can input to the receiver component of the computerized tool an indication of the 2021 Volvo® V60. Accordingly, the taxonomy component can search the keyword-object taxonomy for the 2021 Volvo® V60. In various cases, the taxonomy component can identify the best keyword combination that is linked/mapped to the 2021 Volvo® V60. Thus, the entity can use such best keyword combination in advertising during the marketing campaign (e.g., the entity can now know which words/phrases are most strongly correlated, in the collective opinion of potential customers, to the 2021 Volvo® V60).

As another example, suppose that an entity desires to launch a marketing campaign for the 2021 Volvo® XC40. In such case, the entity can input to the receiver component of the computerized tool an indication of the 2021 Volvo® XC40. Accordingly, the taxonomy component can search the keyword-object taxonomy for the 2021 Volvo® XC40. In various cases, the taxonomy component can identify the best keyword combination that is linked/mapped to the 2021 Volvo® XC40. Thus, the entity can use such best keyword combination in advertising during the marketing campaign (e.g., the entity can now know which words/phrases are most strongly correlated, in the collective opinion of potential customers, to the 2021 Volvo® XC40).

In any case, various embodiments of the invention can be considered as a computerized tool that can build, in an objective and rigorous fashion, a keyword-object taxonomy based on search engine histories for any suitable object classes of interest. Once the keyword-object taxonomy is built, the computerized tool can leverage the keyword-object taxonomy so as to objectively identify which keyword combinations are minimally redundant and maximally relevant with respect to a desired object class. Accordingly, such identified keyword combinations can be used in a marketing campaign for the desired object class.

Various embodiments of the invention can be employed to use hardware and/or software to solve problems that are highly technical in nature (e.g., to facilitate keyword-object taxonomy generation and/or utilization), that are not abstract and that cannot be performed as a set of mental acts by a human. Further, some of the processes performed can be performed by a specialized computer. Specifically, such processes can include: accessing, by a device operatively coupled to a processor, an input object class; and outputting, by the device, one or more keyword combinations that are non-redundant and relevant to the input object class, based on querying a keyword-object taxonomy. In some cases, such processes can further include: accessing, by the device, a set of recorded keyword combinations and a set of recorded object classes respectively corresponding to the set of recorded keyword combinations; and generating, by the device and via a feature selection algorithm, the keyword-object taxonomy based on the set of recorded keyword combinations and the set of recorded object classes.

Such defined tasks are not performed manually by humans. Moreover, neither the human mind nor a human with pen and paper can electronically build a keyword-object taxonomy by executing a feature selection algorithm (e.g., mRMR) on a set of recorded keyword combinations and a set of recorded object classes. Furthermore, neither the human mind nor a human with pen and paper can electronically query the keyword-object taxonomy so as to output keyword combinations that are non-redundant and relevant to an input object class. Instead, various embodiments of the invention are inherently and inextricably tied to computer technology and cannot be implemented outside of a computing environment (e.g., a keyword-object taxonomy is a software data structure in which different keyword combinations are digitally mapped/linked to different object classes; thus, a computerized tool that electronically builds and/or queries a keyword-object taxonomy is a computerized device that cannot be implemented in any sensible way without computers).

In various instances, embodiments of the invention can integrate into a practical application the disclosed teachings regarding keyword-object taxonomy generation and/or utilization. Indeed, as described herein, various embodiments of the invention, which can take the form of systems and/or computer-implemented methods, can be considered as a computerized tool that can electronically construct a keyword-object taxonomy (e.g., a mapping between keyword combinations and object classes) by executing a feature selection algorithm (e.g., mRMR) on a set of recorded keyword combinations and a set of recorded object classes as provided by one or more search engines. Furthermore, the computerized tool can electronically query the keyword-object taxonomy so as to identify maximally relevant and minimally redundant keyword combinations for any desired object class. That is, such a computerized tool can objectively identify which keywords are mostly strongly correlated with the desired object class, according to the collective opinion of potential customers who have inputted such keywords into online search engines. Once such keywords are identified, they can be utilized in a marketing campaign for the desired object class. A computerized tool that objectively identifies maximally relevant and minimally redundant keywords when given an inputted object class certainly constitutes a useful and practical application of computers.

Furthermore, various embodiments of the invention can control tangible, hardware-based, and/or software-based devices based on the disclosed teachings. For example, online search engines are real-world computer programs with which real people can and do interact. As explained in this disclosure, the computerized tool described herein can execute a feature selection algorithm (e.g., mRMR) on the search histories of such online search engines, so as to construct a keyword-object taxonomy (e.g., a mapping of object classes to relevant and non-redundant keyword combinations describing the object classes). In various instances, the computerized tool can receive a real-world query indicating a desired object class, and the computerized tool can search through the keyword-object taxonomy to identify one or more maximally relevant and minimally redundant keyword combinations that describe the desired object class. In various aspects, such maximally relevant and minimally redundant keyword combinations can be utilized in a real-world marketing campaign as desired.

It should be appreciated that the figures and the herein disclosure describe non-limiting examples of various embodiments of the invention.

FIG. 1 illustrates a block diagram of an example, non-limiting system 100 that can facilitate keyword-object taxonomy generation and utilization in accordance with one or more embodiments described herein. As shown, a keyword-object taxonomy system 102 can be electronically integrated, via any suitable electronic connections, with one or more search engines 104.

In various aspects, the one or more search engines 104 can include any suitable number of any suitable online search engines. Non-limiting examples of an online search engine include Google®, Bing®, Yahoo!®, Duck Duck Go®, Yandex®, and/or Volvo Car Search®. In various instances, the one or more search engines 104 can be associated with a set of recorded keyword combinations 106 and a set of recorded object classes 108. As mentioned above, an object class can be, represent, and/or otherwise designate any suitable product, service, activity, organization, institution, person, animal, and/or other thing as desired and/or at any suitable level of granularity.

In various cases, the set of recorded object classes 108 can respectively correspond to the set of recorded keyword combinations 106. More specifically, the set of recorded keyword combinations 106 can include any suitable number of keyword combinations which have been inputted, by any suitable number of any suitable entities (e.g., human and/or otherwise), into at least one of the one or more search engines 104. Moreover, the set of recorded object classes 108 can include any suitable number of object classes which are respectively associated with webpages that were ultimately clicked on and/or visited by such entities based on the set of recorded keyword combinations 106. For example, if a first keyword combination in the set of recorded keyword combinations 106 corresponds to a first object class in the set of recorded object classes 108, this can indicate that some entity had inputted the first keyword combination into at least one of the one or more search engines 104, that the at least one of the one or more search engines 104 had returned results including a link to a webpage describing and/or pertaining to the first object class, and that the entity had ultimately clicked on that link. Accordingly, the set of recorded keyword combinations 106 and the set of recorded object classes 108 can be considered as collectively representing any suitable number of search histories and/or online search journeys that have been recorded and/or documented by the one or more search engines 104. In still other words, the set of recorded keyword combinations 106 and the set of recorded object classes 108 can be considered as collectively capturing the intentions and/or conceptions of potential customers that have utilized the one or more search engines 104.

As explained herein, the keyword-object taxonomy system 102 can leverage the set of recorded keyword combinations 106 and the set of recorded object classes 108, so as to build a keyword-object taxonomy that objectively maps object classes to maximally relevant and/or minimally redundant keywords.

In various embodiments, the keyword-object taxonomy system 102 can comprise a processor 110 (e.g., computer processing unit, microprocessor) and a computer-readable memory 112 that is operably connected to the processor 110. The memory 112 can store computer-executable instructions which, upon execution by the processor 110, can cause the processor 110 and/or other components of the keyword-object taxonomy system 102 (e.g., receiver component 114, ranking component 116, taxonomy component 118) to perform one or more acts. In various embodiments, the memory 112 can store computer-executable components (e.g., receiver component 114, ranking component 116, taxonomy component 118), and the processor 110 can execute the computer-executable components.

In various embodiments, the keyword-object taxonomy system 102 can comprise a receiver component 114. In various aspects, the receiver component 114 can electronically receive and/or otherwise electronically access the set of recorded keyword combinations 106 and/or the set of recorded object classes 108. In various instances, the receiver component 114 can electronically retrieve the set of recorded keyword combinations 106 and/or the set of recorded object classes 108 from the one or more search engines 104. In various other instances, the one or more search engines 104 can electronically transmit and/or store the set of recorded keyword combinations 106 and/or the set of recorded object classes 108 in any suitable database (not shown) that is electronically accessible to the receiver component 114, and the receiver component 114 can electronically retrieve the set of recorded keyword combinations 106 and/or the set of recorded object classes 108 from the database. In any case, the receiver component 114 can electronically obtain the set of recorded keyword combinations 106 and/or the set of recorded object classes 108, such that other components of the keyword-object taxonomy system 102 can manipulate and/or otherwise interact with the set of recorded keyword combinations 106 and/or the set of recorded object classes 108.

In various embodiments, the keyword-object taxonomy system 102 can comprise a ranking component 116. In various aspects, the ranking component 116 can electronically execute a feature selection algorithm on the set of recorded keyword combinations 106 and/or the set of recorded object classes 108. Execution of the feature selection algorithm can, in various instances, cause the ranking component 116 to identify unique keywords in the set of recorded keyword combinations 106 and unique object classes in the set of recorded object classes 108. Moreover, execution of the feature selection algorithm can cause the ranking component 116 to compute a relevance score between each unique keyword and each unique object class, where the relevance score can be a scalar that numerically quantifies how strongly and/or weakly correlated the unique keyword is with the unique object class. Furthermore, execution of the feature selection algorithm can cause the ranking component 116 to compute a redundancy score between each pair of unique keywords, where the redundancy score can be a scalar that numerically quantifies how strongly and/or weakly correlated the pair of unique keywords are with each other. Further still, execution of the feature selection algorithm can, for each unique object class, cause the ranking component 116 to iteratively construct different combinations of the unique keywords, in search of a combination that has a maximized average relevance score with respect to the unique object class and that has a minimized average redundancy score. In various cases, such combination can be referred to as the maximally relevant and minimally redundant keyword combination with respect to the unique object class. In various cases, such combination can also be referred to as the best keyword combination for the unique object class. In any case, the ranking component 116 can, via the feature selection algorithm, identify a best keyword combination for each unique object class in the set of recorded object classes 108.

In various embodiments, the keyword-object taxonomy system 102 can comprise a taxonomy component 118. In various aspects, the taxonomy component 118 can electronically build a keyword-object taxonomy based on the results generated by the execution of the feature selection algorithm by the ranking component 116. More specifically, the ranking component 116 can identify a best keyword combination for each unique object class in the set of recorded object classes. In various instances, the taxonomy component 118 can electronically generate a mapping and/or a linkage between each unique object class and its corresponding best keyword combination, thereby resulting in a set of mappings/linkages. In various cases, such set of mappings/linkages can be collectively considered as the keyword-object taxonomy.

In various cases, the keyword-object taxonomy system 102 can leverage and/or query the keyword-object taxonomy so as to identify a best keyword combination for any inputted object class. For instance, an entity associated with a client device (not shown) can desire to determine the best words/phrases to use when facilitating a marketing campaign for a desired object class. Accordingly, in various aspects, the receiver component 114 can electronically receive, from the client device, an indication of the particular object class. In various cases, the taxonomy component 118 can electronically identify the particular object class in the keyword-object taxonomy, and the taxonomy component 118 can identify the maximally relevant and minimally redundant keyword combination that is linked/mapped to the particular object class. Accordingly, in various instances, the taxonomy component 118 can electronically transmit the maximally relevant and minimally redundant keyword combination to the client device, so that the client device (and/or the entity operating the client device) can utilize the maximally relevant and minimally redundant keyword combination in the desired marketing campaign.

Figure 2:
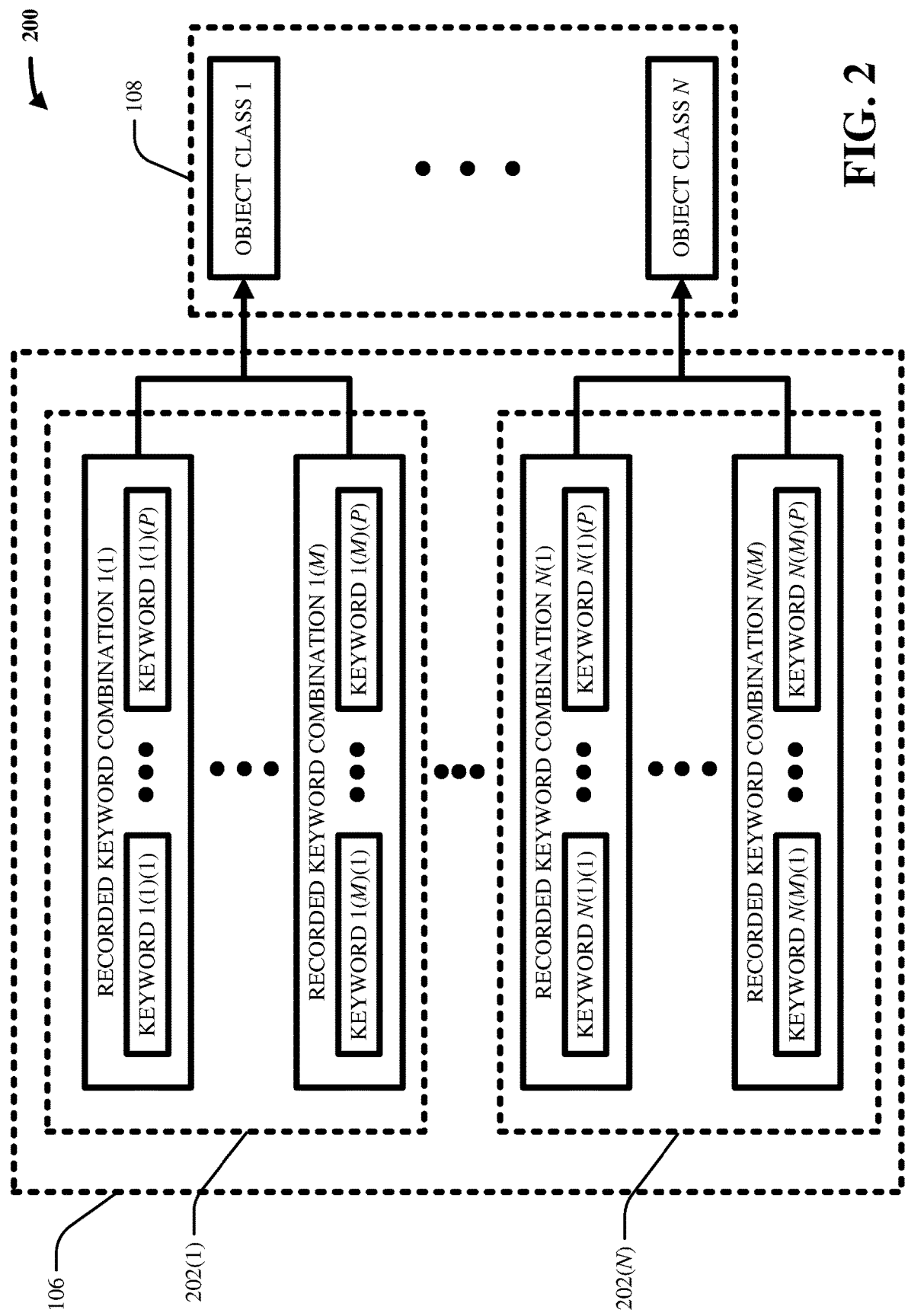
FIG. 2 illustrates an example, non-limiting block diagram of a set of recorded keyword combinations respectively corresponding to a set of object classes in accordance with one or more embodiments described herein.

FIG. 2 illustrates an example, non-limiting block diagram 200 of a set of recorded keyword combinations respectively corresponding to a set of object classes in accordance with one or more embodiments described herein. In other words, FIG. 2 depicts an example and non-limiting embodiment of the set of recorded keyword combinations 106 and the set of recorded object classes 108.

As shown, the set of recorded object classes 108 can comprise n unique object classes, for any suitable positive integer n (e.g., object class 1 to object class n). As also shown, in various instances, the set of recorded keyword combinations 106 can comprise n subsets of recorded keyword combinations (e.g., a subset 202(1) to a subset 202(n)) that respectively correspond to the set of recorded object classes 108. That is, the subset 202(1) can correspond to the object class 1, and the subset 202(n) can correspond to the object class n.

In various cases, the subset 202(1) can include any suitable number of keyword combinations that correspond to the object class 1. For instance, subset 202(1) can include m keyword combinations that correspond to the object class 1 (e.g., a recorded keyword combination 1(1) to a recorded keyword combination 1(m)), for any suitable positive integer m. That is, one or more entities can have inputted the recorded keyword combination 1(1) into the one or more search engines 104 and ultimately clicked on and/or visited a website that pertained to the object class 1. Similarly, one or more entities can have inputted the recorded keyword combination 1(m) into the one or more search engines 104 and ultimately clicked on and/or visited a website that pertained to the object class 1. Stated differently, the subset 202(1) can include different keyword combinations which one or more entities entered into the one or more search engines 104 in order to arrive at a webpage corresponding to the object class 1. Stated differently still, the recorded keyword combinations in the subset 202(1) can be considered as the words/phrases which one or more entities selected when such one or more entities desired and/or intended to visit a webpage describing the object class 1.

In various aspects, the recorded keyword combination 1(1) can include any suitable number of keywords. For example, the recorded keyword combination 1(1) can include p keywords (e.g., a keyword 1(1)(1) to a keyword 1(1)(p)), for any suitable positive integer p. Similarly, the recorded keyword combination 1(m) can include any suitable number of keywords. For instance, the recorded keyword combination 1(m) can include p keywords (e.g., a keyword 1(m)(1) to a keyword 1(m)(p)).

Although FIG. 2 illustrates the recorded keyword combination 1(1) and the recorded keyword combination 1(m) as having the same number of keywords, this is a mere non-limiting example for ease of illustration. Those having ordinary skill in the art will appreciate that different recorded keyword combinations in the subset 202(1) can have the same and/or different numbers of keywords as each other. As an example, suppose that the object class 1 represents a 2021 Volvo® V60 vehicle. In such case, the subset 202(1) can include "volvo 2021 cross country" as a first recorded keyword combination, can include "2021 country wagon" as a second recorded keyword combination, and/or can include "cross country wagon" as a third keyword combination. In this example, the first recorded keyword combination has four keywords (e.g., "volvo," "2021," "cross," and "country"), whereas the second recorded keyword combination has three keywords (e.g., "2021," "country," and "wagon"), and whereas the third recorded keyword combination also has three keywords (e.g., "cross," "country," and "wagon"). Thus, different keyword combinations can have the same and/or different numbers of keywords as each other.

Moreover, although FIG. 2 illustrates the recorded keyword combination 1(1) and the recorded keyword combination 1(m) as having different keywords, this is a mere non-limiting example for ease of illustration. Those having ordinary skill in the art will appreciate that different recorded keyword combinations in the subset 202(1) can have any suitable number of words in common with each other and/or can have no words in common with each other. As an example, suppose that the object class 1 represents a 2021 Volvo® V60 vehicle. Furthermore, suppose that the subset 202(1) includes "volvo cross country" as a first recorded keyword combination, "2021 cross country" as a second recorded keyword combination, and "volvo wagon" as a third recorded keyword combination. In such case, the first recorded keyword combination and the second recorded keyword combination can have two keywords in common (e.g., "cross" and "country"), whereas the first recorded keyword combination and the third recorded keyword combination have one keyword in common (e.g., "volvo"), and whereas the second recorded keyword combination and the third recorded keyword combination have no keywords in common. Thus, different keyword combinations can make use of the same and/or different keywords as each other.

Just as the subset 202(1) can correspond to the object class 1, the subset 202(n) can correspond to the object class n. In various cases, the subset 202(n) can include any suitable number of keyword combinations that correspond to the object class n. For instance, subset 202(n) can include m keyword combinations that correspond to the object class 1 (e.g., a recorded keyword combination n(1) to a recorded keyword combination n(m)), for any suitable positive integer m. That is, one or more entities can have inputted the recorded keyword combination n(1) into the one or more search engines 104 and ultimately clicked on and/or visited a website that pertained to the object class n. Similarly, one or more entities can have inputted the recorded keyword combination n(m) into the one or more search engines 104 and ultimately clicked on and/or visited a website that pertained to the object class n. Stated differently, the subset 202(n) can include different keyword combinations which one or more entities entered into the one or more search engines 104 in order to arrive at a webpage corresponding to the object class n. Stated differently still, the recorded keyword combinations in the subset 202(n) can be considered as the words/phrases which one or more entities selected when such one or more entities desired and/or intended to visit a webpage describing the object class n.

Although FIG. 2 depicts the subset 202(n) as having the same number of recorded keyword combinations as the subset 202(1), this is a mere non-limiting example for ease of illustration. Those having ordinary skill in the art will appreciate that the subset 202(n) can have the same number of and/or a different number of recorded keyword combinations as compared to the subset 202(1).

In various aspects, the recorded keyword combination n(1) can include any suitable number of keywords. For example, the recorded keyword combination 1(1) can include p keywords (e.g., a keyword n(1)(1) to a keyword n(1)(p)), for any suitable positive integer p. Similarly, the recorded keyword combination n(m) can include any suitable number of keywords. For instance, the recorded keyword combination n(rn) can include p keywords (e.g., a keyword n(m)(1) to a keyword n(m)(p)).

Although FIG. 2 illustrates the recorded keyword combination n(1) and the recorded keyword combination n(m) as having the same number of keywords, this is a mere non-limiting example for ease of illustration. Those having ordinary skill in the art will appreciate that different recorded keyword combinations in the subset 202(n) can have the same and/or different numbers of keywords as each other.

Furthermore, although FIG. 2 illustrates the recorded keyword combination n(1) and the recorded keyword combination n(m) as having different keywords, this is a mere non-limiting example for ease of illustration. Those having ordinary skill in the art will appreciate that different recorded keyword combinations in the subset 202(n) can have any suitable number of words in common with each other and/or can have no words in common with each other.

Moreover, although FIG. 2 depicts the recorded keyword combination n(1) as have the same number of keywords as the recorded keyword combination 1(1), and/or depicts the recorded keyword combination n(m) as having the same number of keywords as the recorded keyword combination 1(m), this is a mere non-limiting example for ease of illustration. Those having ordinary skill in the art will appreciate that different keyword combinations in the set of recorded keyword combinations 106 can have the same number of keywords and/or different numbers of keywords as each other.

Although not shown in FIG. 2, the one or more search engines 104 can append any other suitable information to the set of recorded keyword combinations 106 (e.g., can record/capture number of online clicks associated with each recorded keyword combination, can record/capture click-through-rate associated with each recorded keyword combination, and/or can record/capture search weights given by the one or more search engines 104 to each recorded keyword combination).

Figure 3:
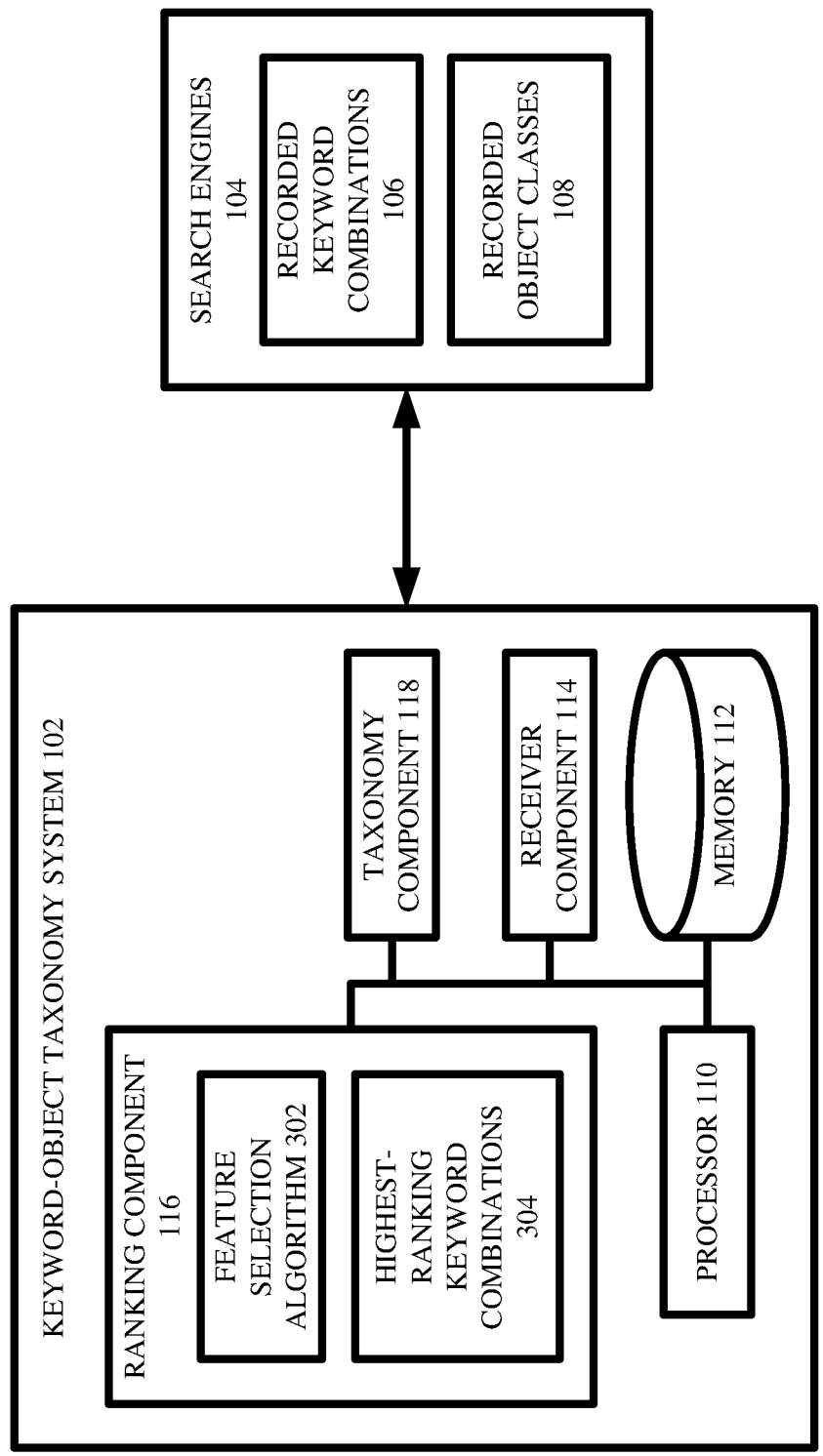
FIG. 3 illustrates a block diagram of an example, non-limiting system including a feature selection algorithm and a set of highest-ranking keyword combinations that facilitates keyword-object taxonomy generation and utilization in accordance with one or more embodiments described herein.

FIG. 3 illustrates a block diagram of an example, non-limiting system 300 including a feature selection algorithm and a set of highest-ranking keyword combinations that can facilitate keyword-object taxonomy generation and utilization in accordance with one or more embodiments described herein. As shown, the system 300 can, in some cases, comprise the same components as the system 100, and can further comprise a feature selection algorithm 302 and/or a set of highest-ranking keyword combinations 304.

In various embodiments, the ranking component 116 can electronically execute the feature selection algorithm 302 on the set of recorded keyword combinations 106 and the set of recorded object classes 108. The result of such execution can be the set of highest-ranking keyword combinations 304. In various instances, the set of highest-ranking keyword combinations 304 can respectively correspond to the set of recorded object classes 108. More specifically, the set of highest-ranking keyword combinations 304 can include one or more maximally relevant and minimally redundant keyword combinations for each unique object class in the set of recorded object classes 108. Stated differently, the set of highest-ranking keyword combinations 304 can be considered as including, for each unique object class in the set of recorded object classes 108, one or more words/phrases that are most strongly correlated with the unique object class, according to the search histories captured/recorded by the one or more search engines 104.

In various aspects, the feature selection algorithm 302 can be any suitable machine learning algorithm that is configured to select a subset of features, variables, and/or attributes from a total set of features, variables, and/or attributes, which subset is relevant and non-redundant with respect to some dependent variable of interest. For example, in some cases, the feature selection algorithm 302 can be a Minimum Redundancy Maximum Relevance (mRMR) algorithm. As another example, the feature selection algorithm 302 can be a Random Forest algorithm that utilizes a Gini-index-based information metric. In various cases, the feature selection algorithm 302 can be any other suitable type of feature selection algorithm (e.g., wrapper feature selection methods, filter feature selection methods, embedded feature selection methods).

In cases where the feature selection algorithm 302 is mRMR, the following can be implemented. In various aspects, mRMR can cause the ranking component 116 to identify a set of unique keywords that make up the set of recorded keyword combinations 106. For instance, consider two non-limiting example keyword combinations: "volvo 2021 cross country" and "volvo electric 2021." The keyword combination "volvo 2021 cross country" includes four keywords, and the keyword combination "volvo electric 2021" includes three keywords. However, these two keyword combinations do not together include seven (e.g., four plus three) unique keywords. Instead, these two keyword combinations together include only five unique keywords (e.g., "volvo," "2021," "cross," "country," and "electric;" "volvo" and "2021" should not be double-counted even though they appear in both of the keyword combinations). In like fashion, mRMR can cause the ranking component 116 to identify each unique object class in the set of recorded object classes 108 (e.g., for ease of explanation, FIG. 2 already illustrates the set of recorded object classes 108 as including n unique object classes).

In various instances, mRMR can further cause the ranking component 116 to compute a relevance score between each unique keyword and each unique object class. In various aspects, the relevance score between a unique keyword and a unique object class can be any suitable scalar (e.g., and/or vector, matrix, and/or tensor, in some cases) that numerically quantifies how strongly correlated and/or how frequently co-incident the unique keyword is with the unique object class. Mathematically, the relevance score can in some cases be equal to and/or otherwise based on mutual information (e.g., entropy-based information loss), pointwise mutual information, the Pearson product-moment correlation coefficient, Relief-based measures, and/or statistical significance tests. As a non-limiting example, a relevance score between a unique keyword and a unique object class can be equal to and/or otherwise based on a ratio between: the number of recorded keyword combinations in the set of recorded keyword combinations 106 which contain the unique keyword and correspond to the unique object class (e.g., this number can be the numerator); and the number of recorded keyword combinations in the set of recorded keyword combinations 106 which contain the unique keyword (e.g., this number can be the denominator). In any case, the ranking component 116 can compute a relevance score between each unique keyword and each unique object class.

In various aspects, mRMR can further cause the ranking component 116 to compute a redundancy score between each pair of unique keywords. In various cases, the redundancy score can be any suitable scalar (e.g., and/or vector, matrix, and/or tensor, in some cases) that numerically quantifies how strongly correlated and/or how frequently co-incident the two unique keywords in the pair are with each other. Mathematically, the redundancy score can in some cases be equal to and/or otherwise based on mutual information (e.g., entropy-based information loss), pointwise mutual information, the Pearson product-moment correlation coefficient, Relief-based measures, and/or statistical significance tests. As a non-limiting example, a redundancy score between a pair of unique keywords can be equal to and/or otherwise based on a ratio between: the number of recorded keyword combinations in the set of recorded keyword combinations 106 which contain both of the pair of the unique keywords (e.g., this number can be the numerator); and the number of recorded keyword combinations in the set of recorded keyword combinations 106 which contain at least one of the pair of unique keywords (e.g., this number can be the denominator). In any case, the ranking component 116 can compute a redundancy score between each pair of unique keywords.

In various instances, mRMR can further cause the ranking component 116 to, for each unique object class, iteratively construct different combinations of the unique keywords in search of a combination that possesses a maximized average relevance score with respect to the unique object class and a minimized average redundancy score.

More specifically, for each combination of unique keywords that is constructed, the ranking component 116 can compute $$D(S, c) = \frac{1}{|S|} \sum_{f_i \in S} I(f_i, c)$$

where c represents a unique object class, where S represents a combination of unique keywords, where D (S, c) represents the relevance score between the unique object class c and the combination of unique keywords S, where $f_i$ represents an i-th unique keyword in the combination of unique keywords S for any suitable positive integer i, and where I ($f_i$, c) represents the relevance score (e.g., mutual information) between the unique keyword $f_i$ and the unique object class c.

Moreover, for each combination of unique keywords that is constructed, the ranking component 116 can further compute $$R(S) = \frac{1}{|S|^2} \sum_{f_i, f_j \in S} I(f_i, f_j)$$

where S represents a combination of unique keywords, where R(S) represents the redundancy score of the combination of unique keywords S, where $f_i$ represents an i-th unique keyword in the combination of unique keywords S for any suitable positive integer i, where $f_j$ represents a j-th unique keyword in the combination of unique keywords S for any suitable positive integer j≠i, and where I($f_i$, $f_j$) represents the redundancy score (e.g., mutual information) between the unique keyword $f_i$ and the unique keyword $f_j$.

Accordingly, for each combination of unique keywords S that is constructed and for each unique object class c, the ranking component 116 can compute a ranking equal to Ranking(S, c)=D(S, c)−R(S). In various instances, for any given unique object class, the combination of unique keywords for which the ranking D (S, c)−R (S) is maximized can be considered as a highest-ranking keyword combination for that given unique object class. In other words, for any given unique object class, the combination of unique keywords for which the ranking D(S, c)−R(S) is maximized can be considered as a maximally relevant and minimally redundant keyword combination with respect to that given unique object class. In various cases, the ranking component 116 can compute such a highest-ranking keyword combination for each unique object class, thereby yielding the set of highest-ranking keyword combinations 304.

As those having ordinary skill in the art will appreciate, mRMR can, in various cases, take into consideration any other suitable information recorded/captured by the one or more search engines 104 (e.g., number of clicks, click-through-rate, and/or search weight).

In various cases, FIGS. 4-7 help to further illustrate how the feature selection algorithm 302 can be implemented to create the set of highest-ranking keyword combinations 304.

Figure 4:
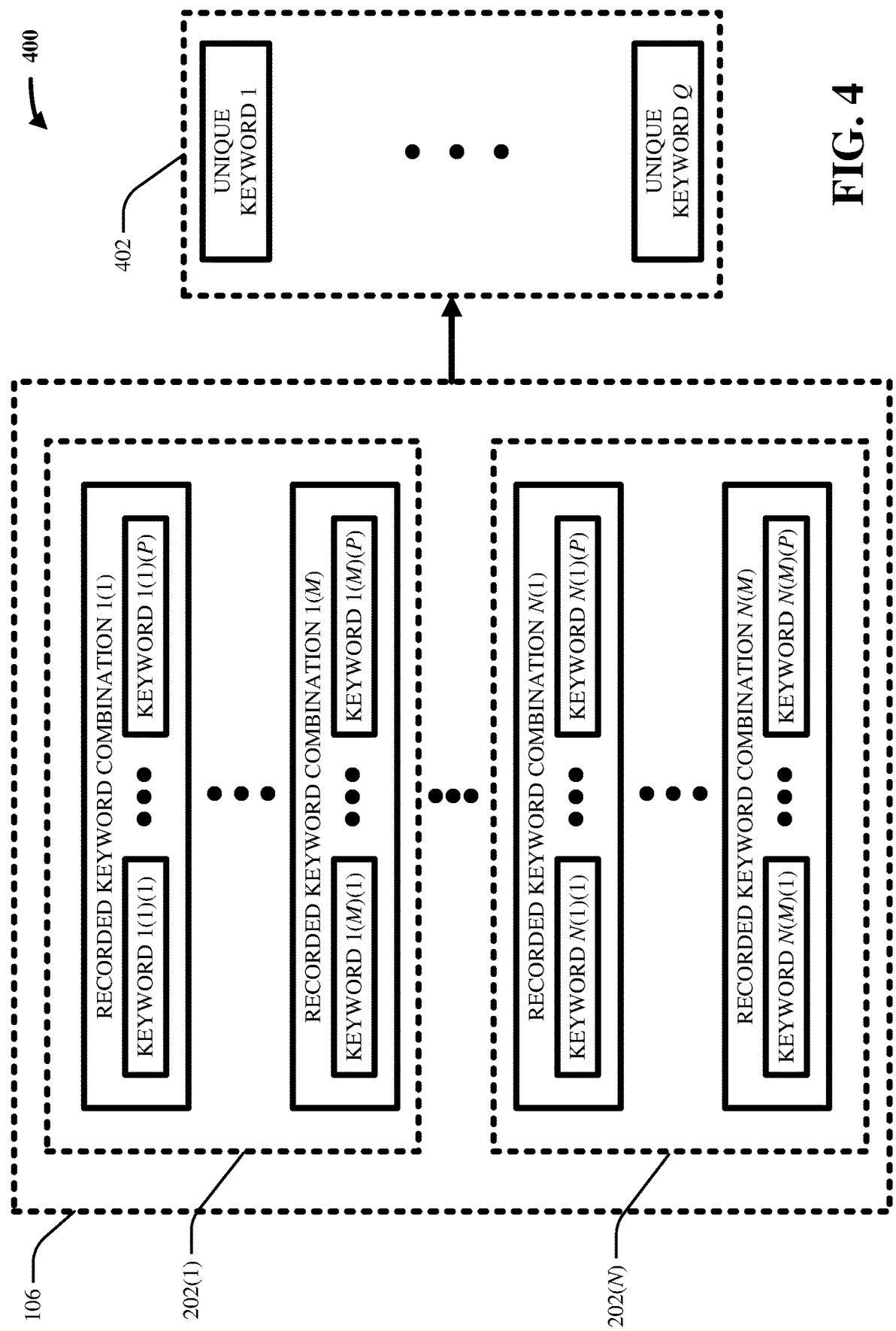
FIG. 4 illustrates an example, non-limiting block diagram of a set of unique keywords used in a set of recorded keyword combinations in accordance with one or more embodiments described herein.

FIG. 4 illustrates an example, non-limiting block diagram 400 of a set of unique keywords used in a set of recorded keyword combinations in accordance with one or more embodiments described herein.

As shown, execution of the feature selection algorithm 302 can cause the ranking component 116 to identify a set of unique keywords 402 based on the set of recorded keyword combinations 106. In various cases, the set of unique keywords 402 can include any suitable number of unique keywords. For example, the set of unique keywords 402 can include q unique keywords (e.g., unique keyword 1 to unique keyword q), for any suitable positive integer q. In various cases, the set of unique keywords 402 can be composed of, without double-counting, all the unique keywords that collectively make up the set of recorded keyword combinations 106 (e.g., the keyword combinations "2021 volvo cross country," "volvo 2021 hybrid," "volvo electric," and "volvo cross country wagon" are collectively composed of seven unique keywords). In various aspects, each unique keyword in the set of unique keywords 402 can be considered as a one-hot-encoded feature, and the feature selection algorithm 302 can cause the ranking component 116 to derive from the set of unique keywords 402 one or more combinations of such features which are maximally relevant and minimally redundant for each unique object class.

Figure 5:
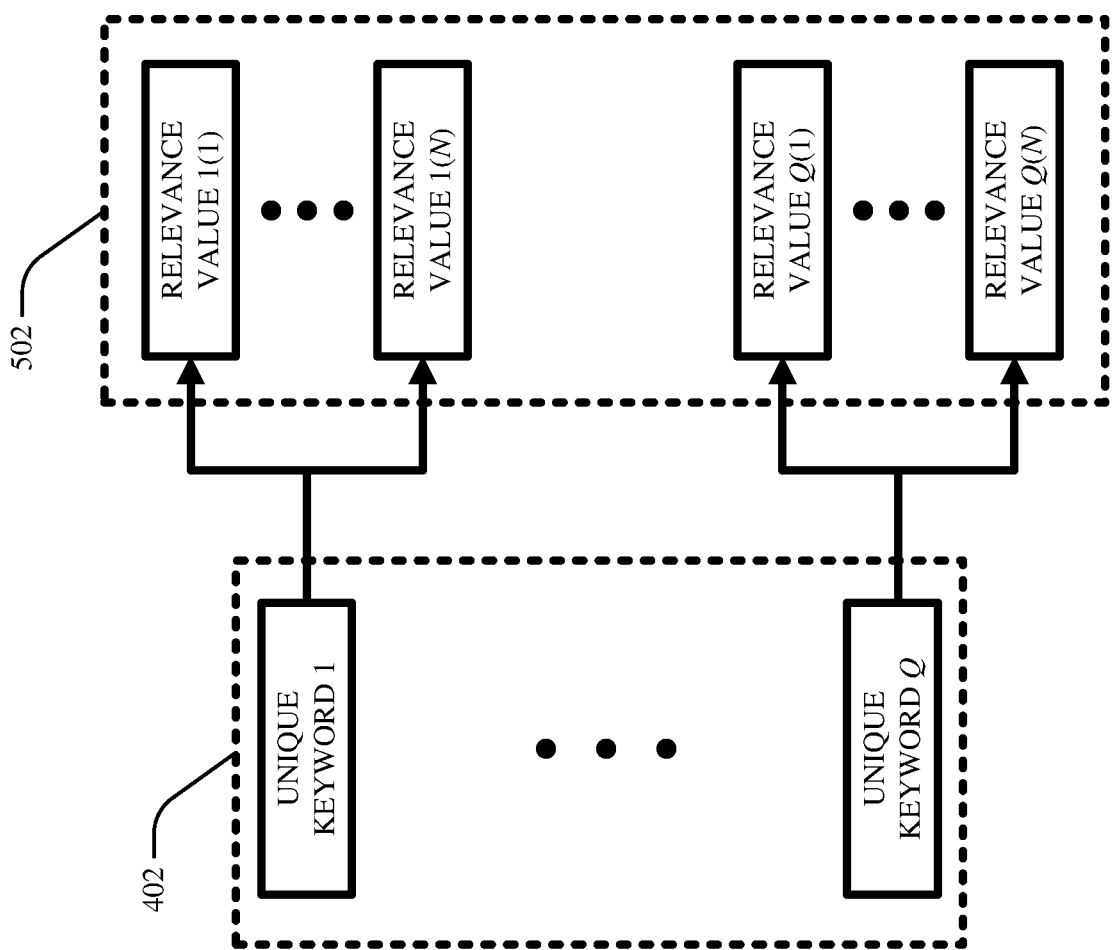
FIG. 5 illustrates an example, non-limiting block diagram of a set of relevance values computed based on a set of unique keywords in accordance with one or more embodiments described herein.

FIG. 5 illustrates an example, non-limiting block diagram 500 of a set of relevance values computed based on a set of unique keywords in accordance with one or more embodiments described herein.

As shown, execution of the feature selection algorithm 302 can cause the ranking component 116 to compute a set of relevance values 502 based on the set of unique keywords 402. More specifically, the ranking component 116 can compute and/or calculate, for each of the set of unique keywords 402, a relevance value (e.g., D(S, c)) with respect to each of the unique object classes. Thus, if there are n unique object classes, the ranking component 116 can compute and/or calculate n relevance values for each unique keyword. For instance, as shown, the ranking component 116 can calculate, for the unique keyword 1, a relevance value 1(1) to a relevance value 1(n), where the relevance value 1(1) can quantify how closely correlated the unique keyword 1 is to the object class 1, and where the relevance value 1(n) can quantify how closely correlated the unique keyword 1 is to the object class n. Similarly, as shown, the ranking component 116 can calculate, for the unique keyword q, a relevance value q(1) to a relevance value q(n), where the relevance value q(1) can quantify how closely correlated the unique keyword q is to the object class 1, and where the relevance value q(n) can quantify how closely correlated the unique keyword q is to the object class n. As explained above, a relevance value can be mathematically defined in any suitable fashion (e.g., can be mutual information and/or pointwise mutual information between a unique keyword and a unique object class).

Figure 6:
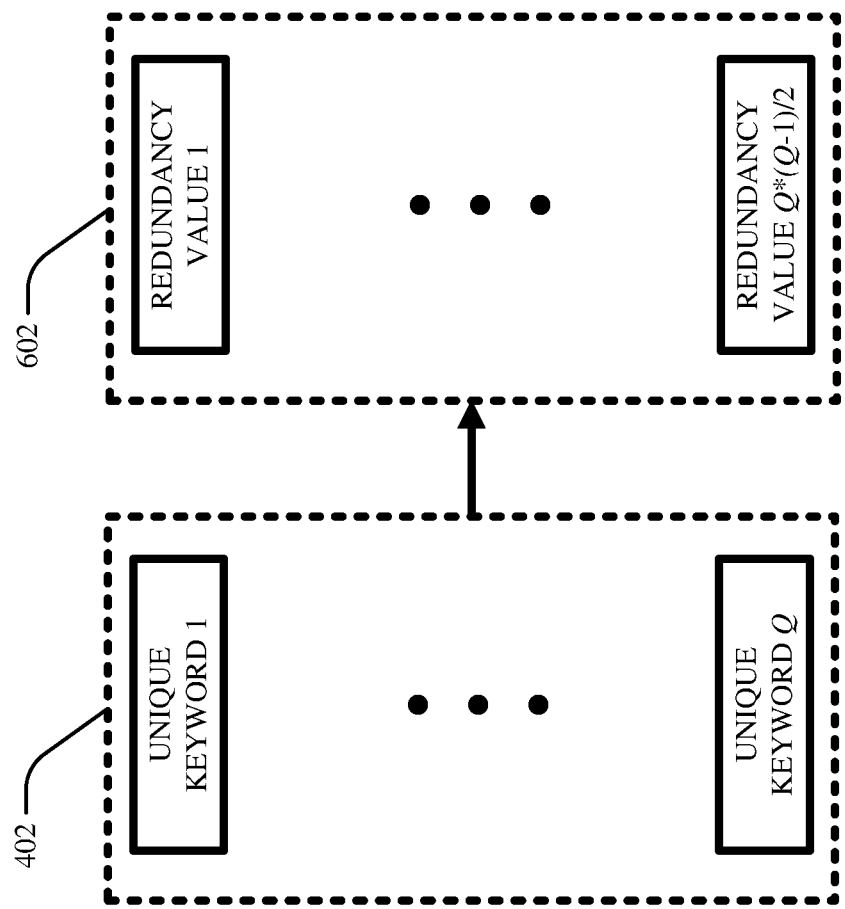
FIG. 6 illustrates an example, non-limiting block diagram of a set of redundancy values computed based on a set of unique keywords in accordance with one or more embodiments described herein.

FIG. 6 illustrates an example, non-limiting block diagram 600 of a set of redundancy values computed based on a set of unique keywords in accordance with one or more embodiments described herein.

As shown, execution of the feature selection algorithm 302 can cause the ranking component 116 to compute a set of redundancy values 602 based on the set of unique keywords 402. More specifically, the ranking component 116 can compute and/or calculate, for any given pair of unique keywords, a redundancy value (e.g., R(S)) for that given pair of unique keywords, where the redundancy value quantifies how closely correlated that given pair of unique keywords are with each other. Thus, if there are q unique keywords in the set of unique keywords 402, the ranking component 116 can compute $$\frac{q(q-1)}{2}$$

redundancy values (e.g., redundancy value 1 to redundancy value q(q−1)/2). After all, there can be $$\frac{q(q-1)}{2}$$

different pairs of unique keywords (e.g., there are $$\frac{q(q-1)}{2}$$

different ways to choose two unique keywords from the set of unique keywords 402). As explained above, a redundancy value can be mathematically defined in any suitable fashion (e.g., can be mutual information and/or pointwise mutual information between two unique keywords).

Figure 7:
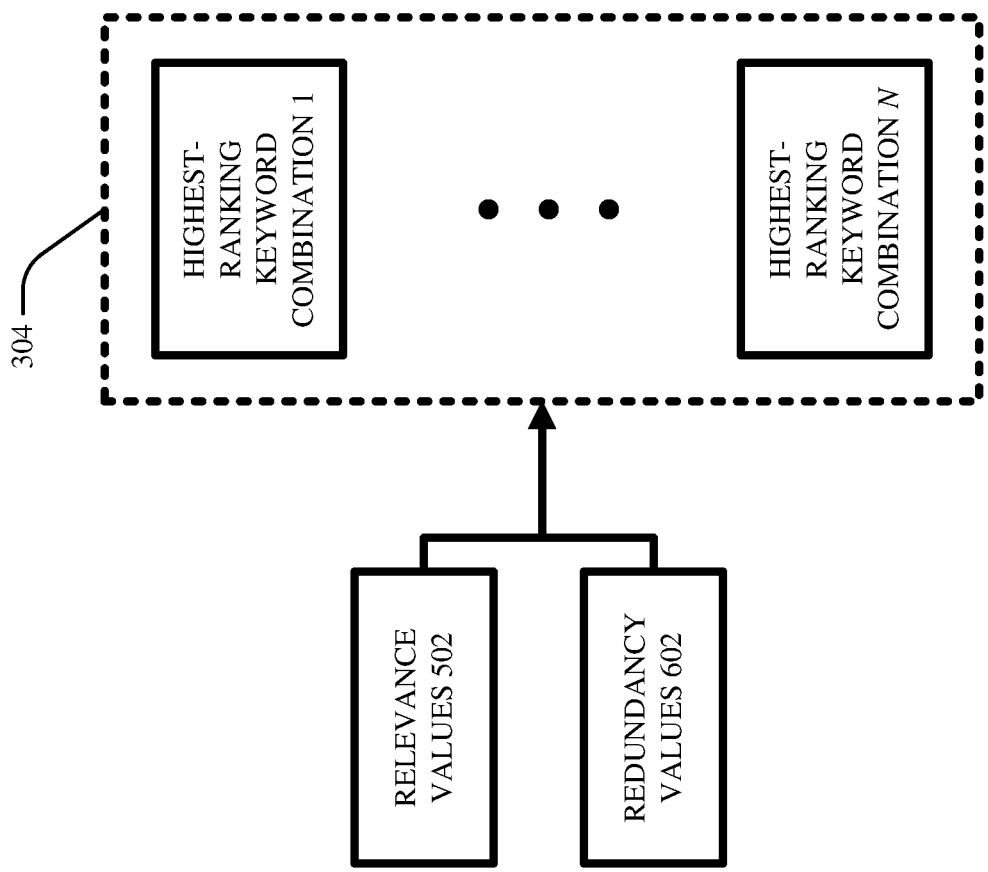
FIG. 7 illustrates an example, non-limiting block diagram of a set of highest-ranking keyword combinations derived from a set of unique keywords based on relevance values and redundancy values of the set of unique keywords in accordance with one or more embodiments described herein.

FIG. 7 illustrates an example, non-limiting block diagram 700 of a set of highest-ranking keyword combinations derived from a set of unique keywords based on relevance values and redundancy values of the set of unique keywords in accordance with one or more embodiments described herein. In other words, FIG. 7 depicts an example, non-limiting embodiment of the set of highest-ranking keyword combinations 304.

As shown, in various aspects, execution of the feature selection algorithm 302 can cause the ranking component 116 to generate the set of highest-ranking keyword combinations 304 based on the set of relevance values 502 and/or based on the set of redundancy values 602. In various instances, as shown, the set of highest-ranking keyword combinations 304 can include n highest-ranking keyword combinations (e.g., one highest-ranking keyword combination per unique object class). In various other cases, however, the set of highest-ranking keyword combinations 304 can include any other suitable number of highest-ranking keyword combinations (e.g., can include more than one highest-ranking keyword combination per unique object class).

More specifically, the ranking component 116 can select any of the unique object classes in the set of recorded object classes 108. Accordingly, the ranking component 116 can iteratively construct combinations of unique keywords from the set of unique keywords 402. For each combination of unique keywords that is constructed, the ranking component 116 can compute a total ranking for the combination, where the total ranking can be equal to and/or otherwise based on a difference between: the average of relevance values of each unique keyword in the combination with respect to the selected unique object class; and the average of the redundancy values of each pair of unique keywords in the combination. In other words, this can be considered as an optimization problem, in which the ranking component 116 identifies a maximally relevant and minimally redundant keyword combination for the selected unique object class. In various aspects, the ranking component 116 can solve such optimization problem for each of the unique object classes in the set of recorded object classes 108. In various cases, as shown, the result can be that the set of highest-ranking keyword combinations 304 includes one highest-ranking keyword combination per unique object class (e.g., the highest-ranking keyword combination 1 can be interpreted as the maximally relevant and minimally redundant combination of unique keywords with respect to the object class 1, and the highest-ranking keyword combination n can be interpreted as the maximally relevant and minimally redundant combination of unique keywords with respect to the object class n).

Although FIG. 7 depicts the set of highest-ranking keyword combinations 304 as including one highest-ranking keyword combination per unique object class, this is a mere non-limiting example for ease of illustration. Those having ordinary skill in the art will appreciate that, in various embodiments, the ranking component 116 can compute any suitable number of highest-ranking keyword combinations per unique object class. For example, for any given unique object class, the ranking component 116 can compute a highest-ranking keyword combination, a second-highest-ranking keyword combination, a third-highest-ranking keyword combination, and/or so on. For instance, for any given unique object class, the ranking component 116 can identify all combinations of the set of unique keywords 402 that have total rankings above any suitable threshold value, and such combinations can be considered as the highest-ranking combinations that correspond to that given unique object class. In this way, more than one highest-ranking keyword combination can be identified for each unique object class.

Figure 8:
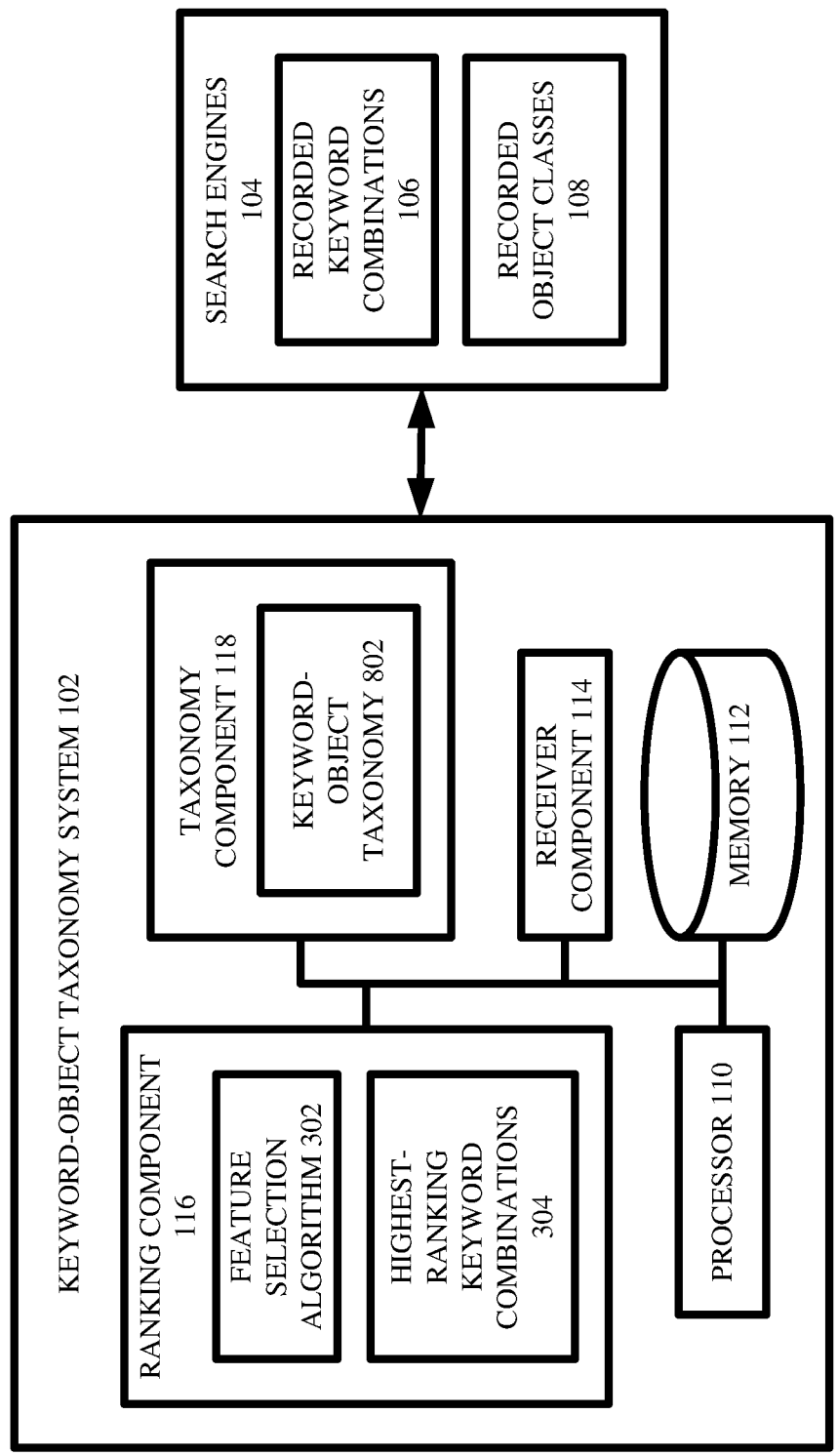
FIG. 8 illustrates a block diagram of an example, non-limiting system including a keyword-object taxonomy that facilitates keyword-object taxonomy generation and utilization in accordance with one or more embodiments described herein.

FIG. 8 illustrates a block diagram of an example, non-limiting system 800 including a keyword-object taxonomy that can facilitate keyword-object taxonomy generation and utilization in accordance with one or more embodiments described herein. As shown, the system 800 can, in some cases, comprise the same components as the system 300, and can further comprise a keyword-object taxonomy 802.

In various embodiments, the taxonomy component 118 can electronically generate the keyword-object taxonomy 802 based on the set of highest-ranking keyword combinations 304. More specifically, the taxonomy component 118 can electronically map and/or otherwise link each of the set of highest-ranking keyword combinations 304 to its respectively corresponding unique object class. This is shown in FIG. 9.

Figure 9:
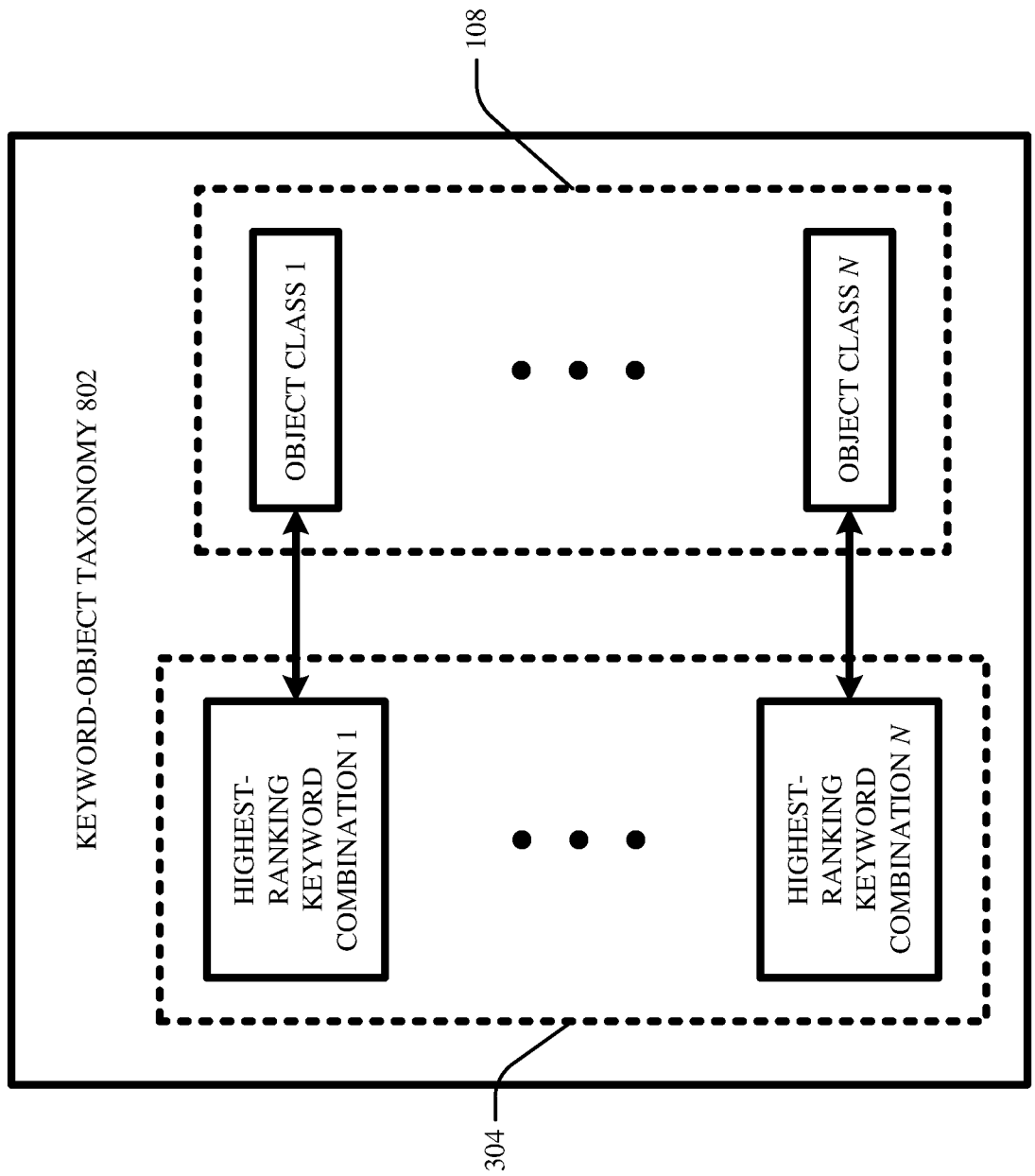
FIG. 9 illustrates a block diagram of an example, non-limiting keyword-object taxonomy in accordance with one or more embodiments described herein.

FIG. 9 illustrates a block diagram 900 of an example, non-limiting keyword-object taxonomy in accordance with one or more embodiments described herein. In other words, FIG. 9 depicts an example and non-limiting embodiment of the keyword-object taxonomy 802.

As shown, the keyword-object taxonomy 802 can include the set of highest-ranking keyword combinations 304 and the set of recorded object classes 108. Furthermore, as shown, the keyword-object taxonomy 802 can include respective linkages and/or mappings from the set of highest-ranking keyword combinations 304 to the set of recorded object classes 108. Specifically, as shown, the highest-ranking keyword combination 1 can be linked and/or mapped to the object class 1. If the highest-ranking keyword combination 1 includes multiple highest-ranking keyword combinations, each of them could be linked and/or mapped to the object class 1. Similarly, as shown, the highest-ranking keyword combination n can be linked and/or mapped to the object class n. If the highest-ranking keyword combination n includes multiple highest-ranking keyword combinations, each of them could be linked and/or mapped to the object class n. In any case, the keyword-object taxonomy 802 can be a mapping of object classes (e.g., 108) to highest-ranking keyword combinations (e.g., 304), such that one or more highest-ranking keyword combinations can be identified when a desired object class is specified.

In various embodiments, the taxonomy component 118 can implement zero-shot learning, so as to fine-tune and/or otherwise improve the maximally relevant and minimally redundant keyword combinations that are included in the keyword-object taxonomy 802. For example, suppose that an object class representing a Volvo® V60 corresponds to the following highest-ranking keyword combination: "cross country travel interstate mileage." In various cases, the taxonomy component 118 can implement zero-shot learning (and/or subject matter expertise) so as to replace such highest-ranking keyword combination with "long distance travel car," which has the same and/or similar substantive meaning as "cross country travel interstate mileage," but which is more concise. As another example, suppose that an object class representing a Volvo® XC90 corresponds to the following highest-ranking keyword combination: "family 8-seater air bags safe." In various cases, the taxonomy component 118 can implement zero-shot learning (and/or subject matter expertise) so as to replace such highest-ranking keyword combination with "safe family car," which has the same and/or similar substantive meaning as "family 8-seater air bags safe," but which is more concise. In this way, the taxonomy component 118 can implement zero-shot learning so as to generate more concise automated keyword combinations as desired.

Figure 10:
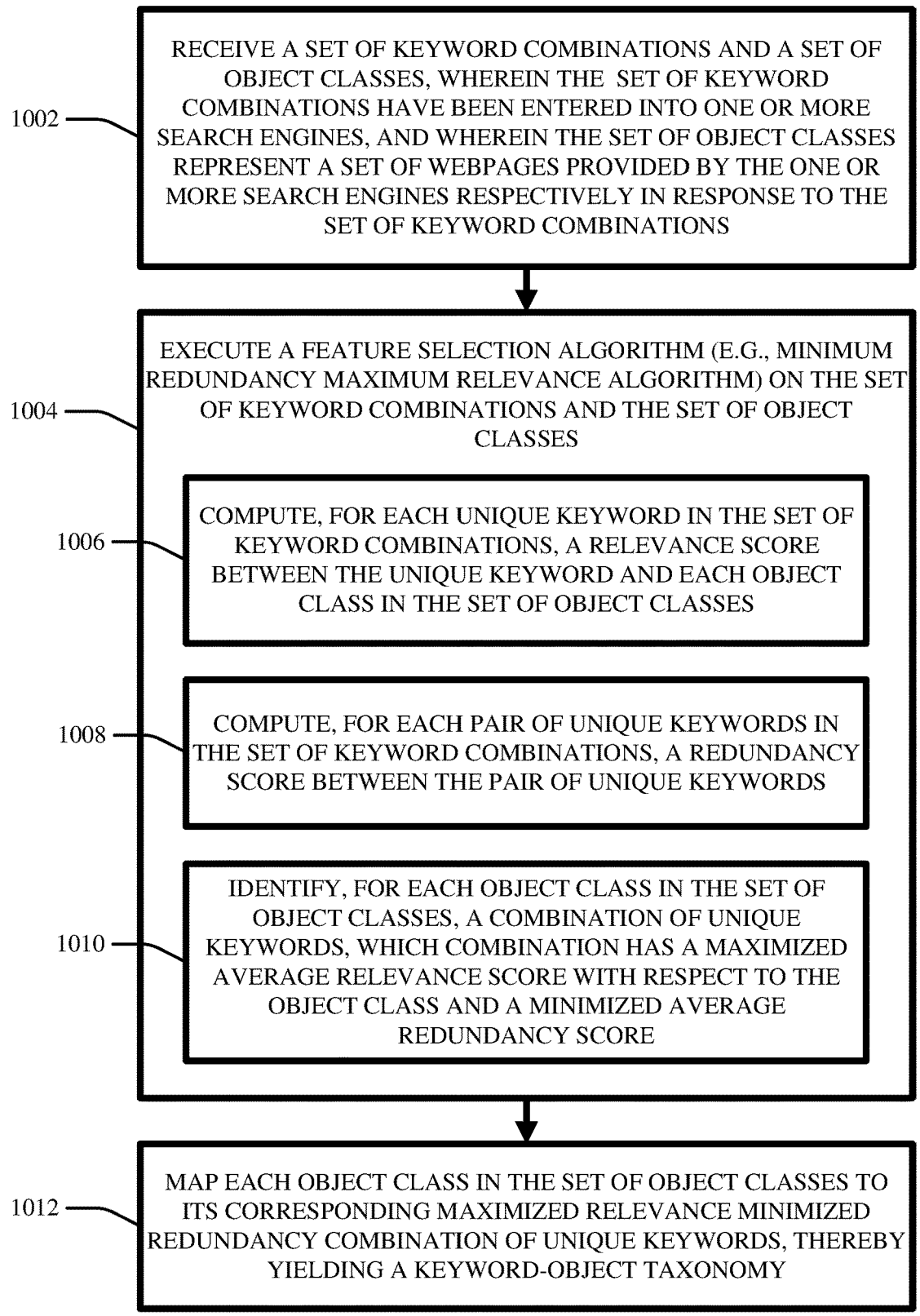
FIG. 10 illustrates a flow diagram of an example, non-limiting computer-implemented method that facilitates keyword-object taxonomy generation in accordance with one or more embodiments described herein.

FIG. 10 illustrates a flow diagram of an example, non-limiting computer-implemented method 1000 that can facilitate keyword-object taxonomy generation in accordance with one or more embodiments described herein. In various cases, the computer-implemented method 1000 can be facilitated by the keyword-object taxonomy system 102.

In various embodiments, act 1002 can include receiving, by a device (e.g., 114) operatively coupled to a processor, a set of keyword combinations (e.g., 106) and a set of object classes (e.g., 108). In various cases, the set of keyword combinations can have been entered into one or more search engines (e.g., 104), and the set of object classes can represent a set of webpages provided by the one or more search engines respectively in response to the set of keyword combinations.

In various aspects, act 1004 can include executing, by the device (e.g., 116), a feature selection algorithm (e.g., 302) on the set of keyword combinations and the set of object classes. In various cases, the feature selection algorithm can be a Minimum Redundancy Maximum Relevance algorithm. In various cases, act 1004 can include various sub-acts, such as acts 1006, 1008, and/or 1010.

In various instances, act 1006 can include computing, by the device (e.g., 116) and for each unique keyword (e.g., one of 402) in the set of keyword combinations, a relevance score (e.g., one of 502) between the unique keyword and each object class (e.g., one of 108) in the set of object classes.

In various aspects, act 1008 can include computing, by the device (e.g., 116) and for each pair of unique keywords (e.g., two of 402) in the set of keyword combinations, a redundancy score (e.g., one of 602) between the pair of unique keywords.

In various instances, act 1010 can include identifying, by the device (e.g., 116) and for each object class (e.g., one of 108) in the set of object classes, a combination of unique keywords (e.g., one of 304), which combination has a maximized average relevance score with respect to the object class and a minimized average redundancy score.

In various aspects, act 1012 can include mapping, by the device (e.g., 118), each object class of the set of object classes to its corresponding maximized relevance minimized redundancy combination of unique keywords, thereby yielding a keyword-object taxonomy (e.g., 802).

Figure 11:
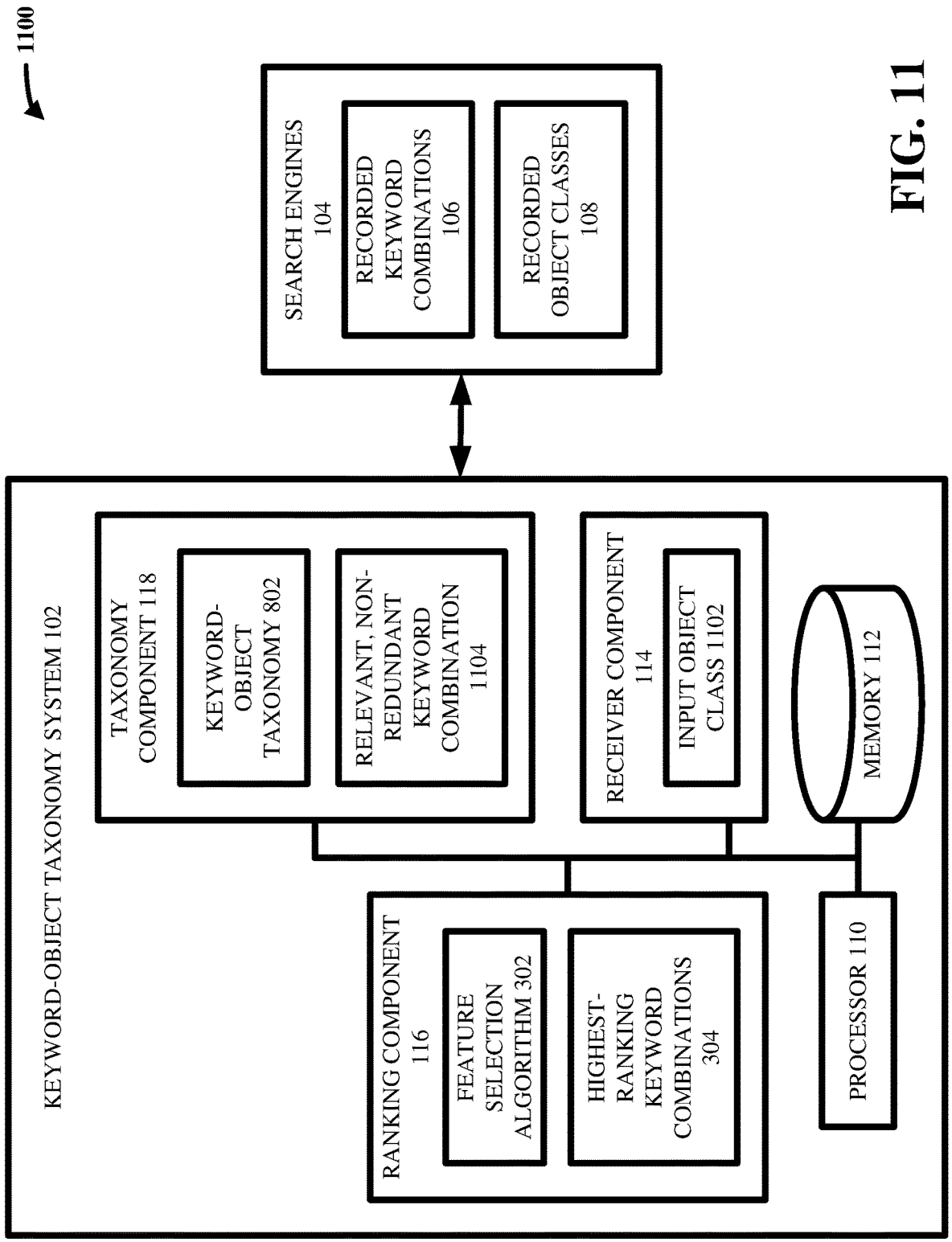
FIG. 11 illustrates a block diagram of an example, non-limiting system including an input object class and a relevant, non-redundant keyword combination that facilitates keyword-object taxonomy generation and utilization in accordance with one or more embodiments described herein.

FIG. 11 illustrates a block diagram of an example, non-limiting system 1100 including an input object class and a relevant, non-redundant keyword combination that can facilitate keyword-object taxonomy generation and utilization in accordance with one or more embodiments described herein. As shown, the system 1100 can, in some cases, comprise the same components as the system 800, and can further comprise an input object class 1102 and a relevant, non-redundant keyword combination 1104.

In various embodiments, the receiver component 114 can electronically receive, from any suitable client device (not shown), an indication of the input object class 1102. In various aspects, the input object class 1102 can be one of the set of recorded object classes 108. Moreover, in various instances, receipt of the indication of the input object class 1102 can be interpreted as a request for words/phrases that are objectively strongly correlated with the input object class 1102. Accordingly, in various cases, the taxonomy component 118 can query the keyword-object taxonomy 802 in search of the input object class 1102. In various aspects, once the taxonomy component 118 has found the input object class 1102 in the keyword-object taxonomy 802, the taxonomy component 118 can identify in the keyword-object taxonomy a maximally relevant and minimally redundant keyword combination that is linked and/or mapped to the input object class 1102. In various cases, such maximally relevant and minimally redundant keyword combination can be considered as the relevant, non-redundant keyword combination 1104. In various instances, the taxonomy component 118 can electronically transmit back to the client device the relevant, non-redundant keyword combination 1104. Accordingly, the client device can, if desired, utilize the relevant, non-redundant keyword combination 1104 in a marketing campaign of which the input object class 1102 is the subject.

As mentioned above, it can be the case that more than one relevant and non-redundant keyword combination is mapped/linked to the input object class 1102 in the keyword-object taxonomy 802. In such case, the taxonomy component 118 can transmit all (and/or any suitable subset) of such relevant and non-redundant keyword combinations to the client device.

Figure 12:
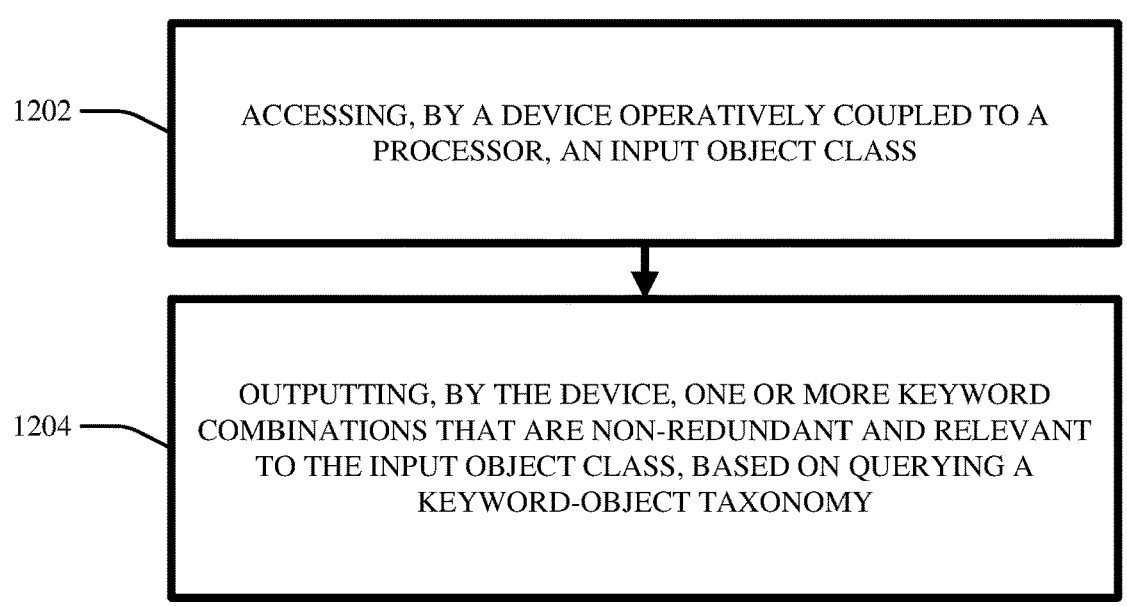
FIG. 12 illustrates a flow diagram of an example, non-limiting computer-implemented method that facilitates keyword-object taxonomy utilization in accordance with one or more embodiments described herein.

FIG. 12 illustrates a flow diagram of an example, non-limiting computer-implemented method 1200 that can facilitate keyword-object taxonomy utilization in accordance with one or more embodiments described herein. In various cases, the computer-implemented method 1200 can be facilitated by the keyword-object taxonomy system 102.

In various embodiments, act 1202 can include accessing, by a device (e.g., 114) operatively coupled to a processor, an input object class (e.g., 1102).

In various aspects, act 1204 can include outputting, by the device (e.g., 118), one or more keyword combinations (e.g.,

1104) that are non-redundant and relevant to the input object class, based on querying a keyword-object taxonomy (e.g., 802).

Although not explicitly shown in FIG. 12, the computer-implemented method 1200 can further include: accessing, by the device (e.g., 114), a set of recorded keyword combinations (e.g., 106) and a set of recorded object classes (e.g., 108) respectively corresponding to the set of recorded keyword combinations; and generating, by the device (e.g., 116 and/or 118), the keyword-object taxonomy based on the set of recorded keyword combinations and the set of recorded object classes.

Although not explicitly shown in FIG. 12, the computer-implemented method 1200 can further include: applying, by the device (e.g., 116), a feature selection algorithm (e.g., 302) to the set of recorded keyword combinations and to the set of recorded object classes. In various cases, for a given object class (e.g., one of 108) in the set of recorded object classes, the feature selection algorithm can rank unique keywords (e.g., 402) in the set of recorded keyword combinations according to redundancy and relevance with respect to the given object class.

Although not explicitly shown in FIG. 12, the computer-implemented method 1200 can further include: identifying, by the device (e.g., 116) and based on the ranked unique keywords, a highest-ranking keyword combination (e.g., one of 304) with respect to the given object class; and inserting, by the device (e.g., 118) and into the keyword-object taxonomy, the given object class and the highest-ranking keyword combination, such that the given object class is mapped to the highest-ranking keyword combination.

Although not explicitly shown in FIG. 12, a first keyword combination of the set of recorded keyword combinations can have been inputted into a search engine (e.g., 104), and a first object class from the set of recorded object classes and that corresponds to the first keyword combination can represent a webpage provided by the search engine in response to the first keyword combination.

Although not explicitly shown in FIG. 12, the input object class can represent a product or service, and the one or more keyword combinations can describe the product or service.

Various embodiments of the invention can include a computerized tool (e.g., 102) that can electronically construct a keyword-object taxonomy (e.g., 802) by applying machine learning techniques (e.g., 302) to real-world search histories (e.g., 106 and 108) that are recorded/captured by real-world search engines (e.g., 104). Accordingly, the keyword-object taxonomy can be considered as capturing the semantic intent of real-world users/entities that have interacted with the real-world search engines. In various cases, the computerized tool can query and/or utilize the keyword-object taxonomy so as to identify optimal words/phrases to be included in marketing campaign content. Such a computerized tool certainly constitutes a useful and practical application of computers.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular computerized object and/or component, it should be understood that this is a non-limiting example of various embodiments of the subject innovation, and it should be further understood that, in various other embodiments of the subject innovation, it can be the case that such description applies to fewer than "each" of that particular computerized object.

Figure 13:
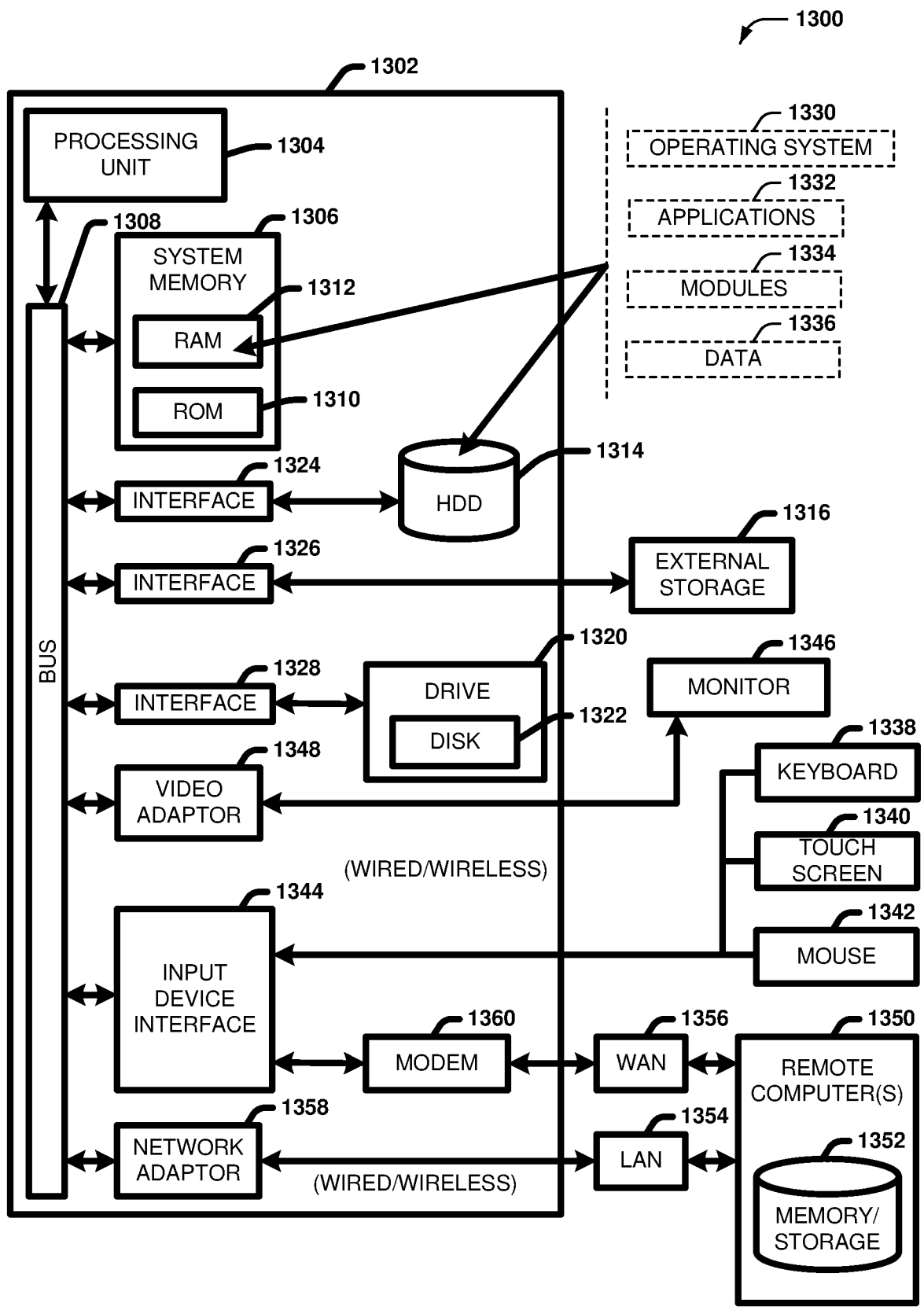
FIG. 13 illustrates a block diagram of an example, non-limiting operating environment in which one or more embodiments described herein can be facilitated.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and a drive 1320, e.g., such as a solid state drive, an optical disk drive, which can read or write from a disk 1322, such as a CD-ROM disc, a DVD, a BD, etc. Alternatively, where a solid state drive is involved, disk 1322 would not be included, unless separate. While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and drive 1320 can be connected to the system bus 1308 by an HDD interface 1324, an external storage interface 1326 and a drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above, such as but not limited to a network virtual machine providing one or more aspects of storage or processing of information. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 14:
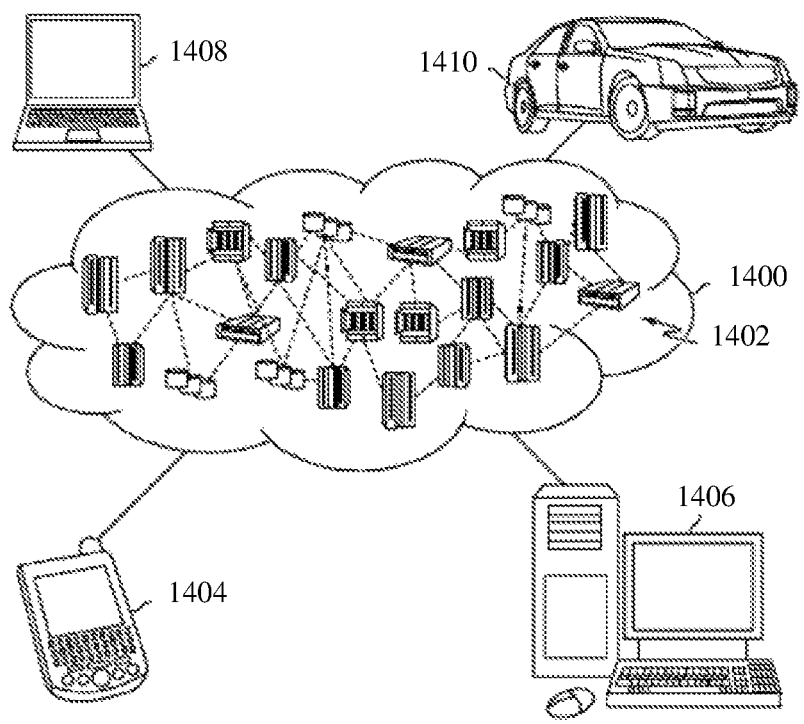
FIG. 14 illustrates an example, non-limiting cloud computing environment in accordance with one or more embodiments described herein.

Referring now to FIG. 14, illustrative cloud computing environment 1400 is depicted. As shown, cloud computing environment 1400 includes one or more cloud computing nodes 1402 with which local computing devices used by cloud consumers, such as, for example, personal digital assistant (PDA) or cellular telephone 1404, desktop computer 1406, laptop computer 1408, and/or automobile computer system 1410 may communicate. Nodes 1402 may communicate with one another. They may be grouped (not shown) physically or virtually, in one or more networks, such as Private, Community, Public, or Hybrid clouds as described hereinabove, or a combination thereof. This allows cloud computing environment 1400 to offer infrastructure, platforms and/or software as services for which a cloud consumer does not need to maintain resources on a local computing device. It is understood that the types of computing devices 1404-1410 shown in FIG. 14 are intended to be illustrative only and that computing nodes 1402 and cloud computing environment 1400 can communicate with any type of computerized device over any type of network and/or network addressable connection (e.g., using a web browser).

Figure 15:
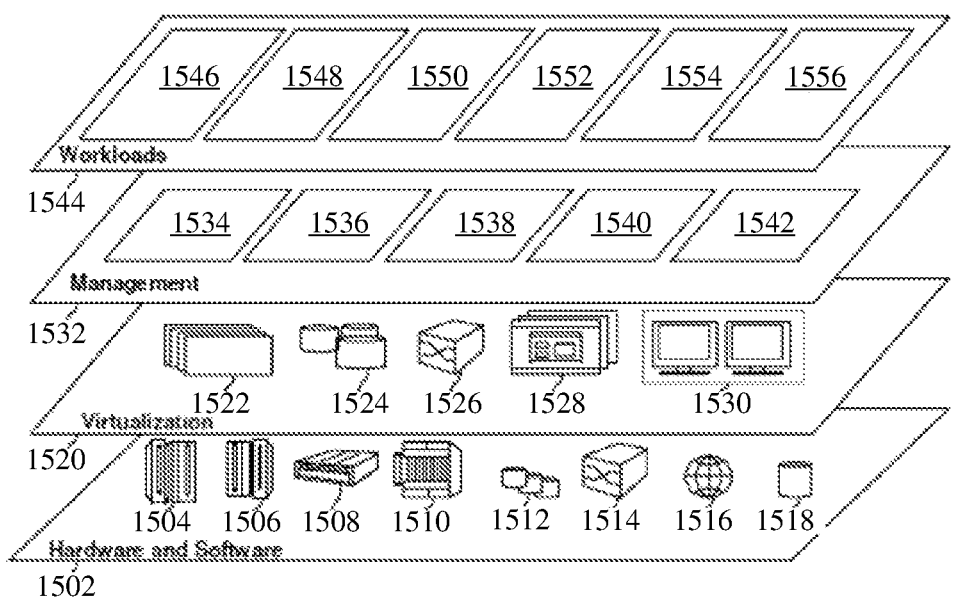
FIG. 15 illustrates example, non-limiting abstraction model layers in accordance with one or more embodiments described herein.

Referring now to FIG. 15, a set of functional abstraction layers provided by cloud computing environment 1400 (FIG. 14) is shown. Repetitive description of like elements employed in other embodiments described herein is omitted for sake of brevity. It should be understood in advance that the components, layers, and functions shown in FIG. 15 are intended to be illustrative only and embodiments of the invention are not limited thereto. As depicted, the following layers and corresponding functions are provided.

Hardware and software layer 1502 includes hardware and software components. Examples of hardware components include: mainframes 1504; RISC (Reduced Instruction Set Computer) architecture based servers 1506; servers 1508; blade servers 1510; storage devices 1512; and networks and networking components 1514. In some embodiments, software components include network application server software 1516 and database software 1518.

Virtualization layer 1520 provides an abstraction layer from which the following examples of virtual entities may be provided: virtual servers 1522; virtual storage 1524; virtual networks 1526, including virtual private networks; virtual applications and operating systems 1528; and virtual clients 1530.

In one example, management layer 1532 may provide the functions described below. Resource provisioning 1534 provides dynamic procurement of computing resources and other resources that are utilized to perform tasks within the cloud computing environment. Metering and Pricing 1536 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1538 provides access to the cloud computing environment for consumers and system administrators. Service level management 1540 provides cloud computing resource allocation and management such that required service levels are met. Service Level Agreement (SLA) planning and fulfillment 1542 provide pre-arrangement for, and procurement of, cloud computing resources for which a future requirement is anticipated in accordance with an SLA.

Workloads layer 1544 provides examples of functionality for which the cloud computing environment may be utilized. Examples of workloads and functions which may be provided from this layer include: mapping and navigation 1546; software development and lifecycle management 1548; virtual classroom education delivery 1550; data analytics processing 1552; transaction processing 1554; and differentially private federated learning processing 1556. Various embodiments of the present invention can utilize the cloud computing environment described with reference to FIGS. 14 and 15 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a processor that executes computer-executable components stored in a computer-readable memory, the computer-executable components comprising:
        a receiver component that accesses an input object class, wherein the input object class represents a subject of results provided by a search engine based on queries,
    wherein the queries respectively comprise groups of keywords; and
        a taxonomy component that:
            determines, for each unique keyword of the groups of keywords, a first relevance score indicative of amount of correlation between the unique keyword and the input subject class,
            determines, for each pair of unique keywords of the groups of keywords, a first redundancy score indicative of amount of correlation between the pair of unique keywords,
            generates different keyword combinations of the unique keywords,
            determines, for each keyword combination of the different keyword combinations, a second relevance score based on respective first relevance scores of unique keywords in the keyword combination,
            determines, for each keyword combination, a second redundancy score based on respective first redundancy scores of pairs of unique keywords in the keyword combination,
            outputs one or more highest-ranking keyword combinations of the different keyword combinations based on the respective second relevance scores and respective second redundancy scores of the different keyword combinations.

2. The system of claim 1, wherein the receiver component accesses the set of recorded keyword combinations and a set of recorded object classes respectively corresponding to the set of recorded keyword combinations, and wherein the taxonomy component generates a keyword-object taxonomy based on the set of recorded keyword combinations and the set of recorded object classes.

3. The system of claim 2, wherein the computer-executable components further comprise:
    a ranking component that applies a feature selection algorithm to the set of recorded keyword combinations and to the set of recorded object classes.

4. The system of claim 3, wherein, for a given object class in the set of recorded object classes, the feature selection algorithm ranks unique keywords in the set of recorded keyword combinations according to redundancy with respect to each other and relevance with respect to the given object class.

5. The system of claim 1, wherein the taxonomy component inserts into a keyword-object taxonomy the input object class and the one or more highest-ranking keyword combinations, such that the input object class is mapped to the one or more highest-ranking keyword combinations.

6. The system of claim 3, wherein the feature selection algorithm is a Minimum Redundancy Maximum Relevance (mRMR) algorithm.

7. The system of claim 2, wherein a first keyword combination of the set of recorded keyword combinations was inputted into the search engine, and wherein a first object class from the set of recorded object classes that corresponds to the first keyword combination represents a subject of a webpage provided by the search engine in response to the first keyword combination.

8. The system of claim 1, wherein the input object class represents a product or service, and wherein the keyword combinations describe the product or service.

9. A computer-implemented method, comprising:
    accessing, by a device operatively coupled to a processor, an input object class, wherein the input object class represents a subject of a result provided by a search engine;
    determining, by the device, for each unique keyword of the groups of keywords, a first relevance score indicative of amount of correlation between the unique keyword and the input subject class;
    determining, by the device, for each pair of unique keywords of the groups of keywords, a first redundancy score indicative of amount of correlation between the pair of unique keywords;
    generating, by the device, different keyword combinations of the unique keywords;
    determining, by the device, for each keyword combination of the different keyword combinations, a second relevance score based on respective first relevance scores of unique keywords in the keyword combination;
    determining, by the device, for each keyword combination, a second redundancy score based on respective first redundancy scores of pairs of unique keywords in the keyword combination; and
    outputting, by the device, one or more highest-ranking keyword combinations of the different keyword combinations based on the respective second relevance scores and respective second redundancy scores of the different keyword combinations.

10. The computer-implemented method of claim 9, further comprising:
    accessing, by the device, the set of recorded keyword combinations and a set of recorded object classes respectively corresponding to the set of recorded keyword combinations; and
    generating, by the device, a keyword-object taxonomy based on the set of recorded keyword combinations and the set of recorded object classes.

11. The computer-implemented method of claim 10, further comprising:
    applying, by the device, a feature selection algorithm to the set of recorded keyword combinations and to the set of recorded object classes.

12. The computer-implemented method of claim 11, wherein, for a given object class in the set of recorded object classes, the feature selection algorithm ranks unique keywords in the set of recorded keyword combinations according to redundancy with respect to each other and relevance with respect to the given object class.

13. The computer-implemented method of claim 9, further comprising:
    inserting, by the device into a keyword-object taxonomy, the input object class and the one or more highest-ranking keyword combinations, such that the input object class is mapped to the one or more highest-ranking keyword combinations.

14. The computer-implemented method of claim 11, wherein the feature selection algorithm is a Minimum Redundancy Maximum Relevance (mRMR) algorithm.

15. The computer-implemented method of claim 10, wherein a first keyword combination of the set of recorded keyword combinations was inputted into the search engine, and wherein a first object class from the set of recorded object classes that corresponds to the first keyword combination represents a subject of a webpage provided by the search engine in response to the first keyword combination.

16. The computer-implemented method of claim 9, wherein the input object class represents a product or service, and wherein the keyword combinations describe the product or service.

17. A computer program product for facilitating keyword-object taxonomy generation and utilization, the computer program product comprising a computer-readable medium having program instructions embodied therewith, the program instructions executable by a processor to cause the processor to:
    access, by the processor, an input object class, wherein the input object class represents a subject of a result provided by a search engine;
    determining, by the processor, for each unique keyword of the groups of keywords, a first relevance score indicative of amount of correlation between the unique keyword and the input subject class;
    determining, by the processor, for each pair of unique keywords of the groups of keywords, a first redundancy score indicative of amount of correlation between the pair of unique keywords;
    generating, by the processor, different keyword combinations of the unique keywords;
    determining, by the processor, for each keyword combination of the different keyword combinations, a second relevance score based on respective first relevance scores of unique keywords in the keyword combination;
    determining, by the processor, for each keyword combination, a second redundancy score based on respective first redundancy scores of pairs of unique keywords in the keyword combination; and
    output, by the processor, one or more highest-ranking keyword combinations of the different keyword combinations based on the respective second relevance scores and respective second redundancy scores of the different keyword combinations.

18. The computer program product of claim 17, wherein the program instructions are further executable to cause the processor to:
    access, by the processor, the set of recorded keyword combinations and a set of recorded object classes respectively corresponding to the set of recorded keyword combinations; and
    generate, by the processor, a keyword-object taxonomy based on the set of recorded keyword combinations and the set of recorded object classes.

19. The computer program product of claim 18, wherein the program instructions are further executable to cause the processor to:
    apply, by the processor, a feature selection algorithm to the set of recorded keyword combinations and to the set of recorded object classes, wherein, for a given object class in the set of recorded object classes, the feature selection algorithm ranks unique keywords in the set of recorded keyword combinations according to redundancy with respect to each other and relevance with respect to the given object class.

20. The computer program product of claim 17, wherein the program instructions are further executable to cause the processor to:
    insert, by the processor into a keyword-object taxonomy, the input object class and the one or more highest-ranking keyword combinations, such that the input object class is mapped to the one or more highest-ranking keyword combinations.

* * * * *